US009919470B2

United States Patent
Behl et al.

(10) Patent No.: US 9,919,470 B2
(45) Date of Patent: Mar. 20, 2018

(54) METHOD OF PREPARING A BIDIRECTIONAL SHAPE-MEMORY ACTUATOR AND METHOD OF ITS USE

(71) Applicant: HELMHOLTZ-ZENTRUM GEESTHACHT ZENTRUM FÜR MATERIAL- UND KÜSTENFORSCHUNG, Geesthacht (DE)

(72) Inventors: Marc Behl, Berlin (DE); Karl Kratz, Berlin (DE); Srinivasa Reddy Chaganti, Co. Kildare (IE); Ulrich Noechel, Berlin (DE); Tilman Sauter, Berlin (DE); Andreas Lendlein, Berlin (DE)

(73) Assignee: HELMHOLTZ-ZENTRUM GEESTHACHT ZENTRUM FUER MATERIAL- UND KUESTENFORSCHUNG GMBH, Geesthacht (DE)

( * ) Notice: Subject to any disclaimer, the term of this patent is extended or adjusted under 35 U.S.C. 154(b) by 0 days.

(21) Appl. No.: 14/408,606

(22) PCT Filed: Jun. 17, 2014

(86) PCT No.: PCT/EP2014/062697
§ 371 (c)(1),
(2) Date: Dec. 17, 2014

(87) PCT Pub. No.: WO2014/206812
PCT Pub. Date: Dec. 31, 2014

(65) Prior Publication Data
US 2016/0136876 A1 May 19, 2016

(30) Foreign Application Priority Data
Jun. 28, 2013 (EP) ..................... 13174361

(51) Int. Cl.
C08G 18/48 (2006.01)
B29C 61/04 (2006.01)
(Continued)

(52) U.S. Cl.
CPC ............ *B29C 61/04* (2013.01); *B29C 61/003* (2013.01); *B29C 61/006* (2013.01); *B29C 61/06* (2013.01);
(Continued)

(58) Field of Classification Search
CPC ...................................................... B29C 61/06
See application file for complete search history.

(56) References Cited

U.S. PATENT DOCUMENTS

| 8,901,253 B2 | 12/2014 | Behl et al. | |
| 2007/0088135 A1* | 4/2007 | Lendlein | C08G 18/4202 525/444 |
| 2012/0018922 A1* | 1/2012 | Kratz | B29C 61/06 264/297.1 |

FOREIGN PATENT DOCUMENTS

| JP | 2002504585 | 2/2002 |
| JP | 2011506726 A | 3/2011 |

(Continued)

OTHER PUBLICATIONS

International Search Report dated Sep. 29, 2014 in International Application No. PCT/EP14/062697. (2 pages).
(Continued)

*Primary Examiner* — Galen H Hauth
(74) *Attorney, Agent, or Firm* — Fox Rothschild LLP

(57) ABSTRACT

The present invention is directed to a method of preparing an actuator capable of being repeatedly and reversibly shifted between two freestanding shapes (A, B) under stress-free conditions upon varying a temperature between a temperature $T_{low}$ and a temperature $T_{sep}$. The method comprising the steps:

Figure 1:
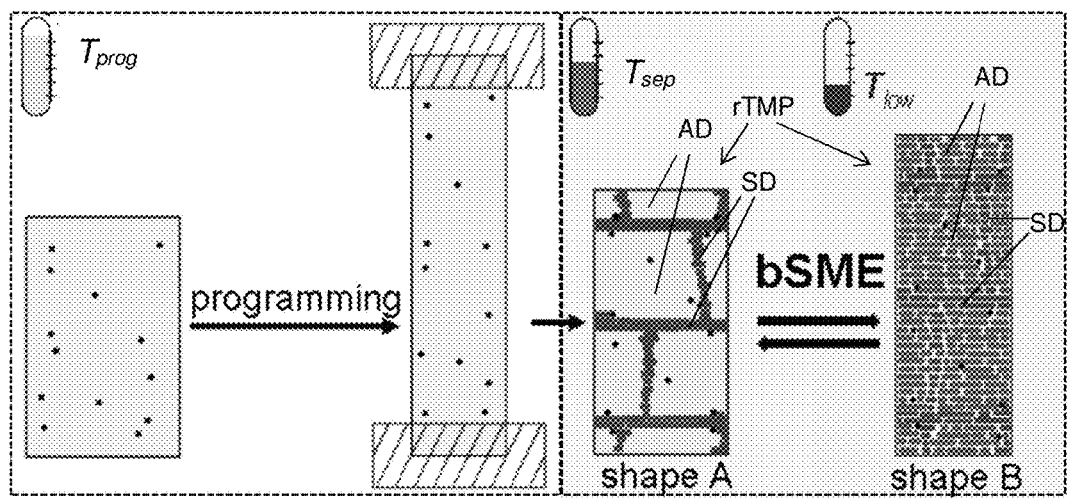

(a) providing an actuator consisting of or comprising a covalently or physically cross-linked polymer network, the polymer comprising a first phase having a thermodynamic phase transition extending in a temperature range from $T_{trans,onset}$ to $T_{trans,offset}$, and an elastic
(Continued)

phase having a glass transition temperature $T_g$, with $T_g < T_{trans,onset}$, the polymer having an initial shape;

(b) deforming the polymer to a deformation shape at a temperature $T_{prog}$ by applying a stress, where the deformation is adapted to align chain segments of the polymer;

(c) setting the polymer to a temperature $T_{low}$ with $T_{low} \leq T_{trans,onset}$ under maintaining the stress as to provide a solidified state of the polymer domains associated with the first phase;

(d) heating the polymer to a predetermined separation temperature $T_{sep}$, with $T_{trans,onset} < T_{sep} < T_{trans,offset}$, under stress-free conditions as to melt first polymeric domains (AD) of the first phase having a transition temperature in the range between $T_{trans,onset}$ and $T_{sep}$ and to maintain second domains (SD) of the first phase having a transition temperature in the range between $T_{sep}$ and $T_{trans,offset}$ in the solidified state, thus implementing shape A, where shape A geometrically lies between the initial shape provided in step (a) and the deformation shape applied in step (b) and shape B is the shape at $T_{low}$ and lies geometrically between shape A and the shape of deformation of step (b).

12 Claims, 19 Drawing Sheets

(51) Int. Cl.
*B29C 61/00* (2006.01)
*B29C 61/06* (2006.01)
*B29K 105/16* (2006.01)
*B29L 7/00* (2006.01)

(52) U.S. Cl.
CPC .. *B29K 2105/16* (2013.01); *B29K 2995/0005* (2013.01); *B29K 2995/0008* (2013.01); *B29K 2995/0018* (2013.01); *B29L 2007/008* (2013.01)

(56) References Cited

FOREIGN PATENT DOCUMENTS

| WO | 9942528 A2 | 8/1999 |
| WO | 199942528 A2 | 8/1999 |
| WO | 2007060019 A2 | 5/2007 |
| WO | 2009095434 A1 | 8/2009 |

OTHER PUBLICATIONS

Behl et al., "Reversible bidirectional shape-memory polymers", Adv Mater (Jun. 13, 2013) 25: 4466-4469.

International Search Report from PCT/EP2013/077831 dated Sep. 26, 2014.

Junjun Li et al.: "Semi-crystalline two-way shape memory elastomer", Polymer, 2011, vol. 52, p. 5320-5325.

* cited by examiner

METHOD OF PREPARING A BIDIRECTIONAL SHAPE-MEMORY ACTUATOR AND METHOD OF ITS USE

CROSS-REFERENCE TO RELATED APPLICATIONS

This application is a § 371 national stage entry of International Application No. PCT/EP2014/062697, filed Jun. 17, 2014, which claims priority to and the benefit of European Application No. 13174361.9, filed Jun. 28, 2013, which are hereby incorporated herein by reference in their entireties.

The present invention relates to a method of preparing a bidirectional shape-memory actuator bSMA, particularly an actuator having a "temperature-memory" in addition to the shape-memory. The invention is further directed to a method of using the actuator.

Conventional shape-memory polymers are able to undergo a shape transition from a "programmed" temporary shape to a memorized permanent shape. However, this is a one-way effect, as a further shape transition requires a renewed thermo-mechanical programming process. In one-way SMPs, the same type of switching domains provides two functions: temporary fixation of a programmed temporary shape and elastic recovery of the permanent shape (Lendlein, A. & Kelch, S. Shape-memory polymers. Angew. Chem. Int. Ed. 41, 2034-2057 (2002)). The thermal transition ($T_{trans}$) of the switching domains such as melting ($T_{trans}=T_m$) or glass transition ($T_{trans}=T_g$) acts as a switch for the shape-memory effect. During a deformation at $T>T_{trans}$ of shape A by application of external stress, the polymer chain segments forming the switching segments are oriented, which results in a decreased state of entropy. Cooling to $T<T_{trans}$ causes the solidification of switching domains e.g. by crystallization or vitrification and in this way the fixation of shape. This process where shape-memory function is created is named programming. The memorized (permanent) shape is recovered by application of heat. Upon exceeding $T_{trans}$, the oriented chain segments recoil driven by a gain in entropy, which irreversibly erases the geometry information of the temporary shape. Thus, the shape-memory effect in conventional one-way SMPs can only be triggered once. For a further shape transition via the shape-memory effect, a new programming process is required.

Moreover, a temperature-memory was implemented in conventional shape-memory polymers (WO 2009/095434 A). By appropriately selecting the temperature $T_{prog}$ at which the polymer was deformed during the programming procedure, with $T_{trans,onset}>T_{prog}>T_{trans,offset}$ the switching temperature could be varied. Again however, the temperature-memory polymer described there has a unidirectional one-way shape-memory effect. Thus, reading out the temperature-memory of polymers, which is their ability to remember the temperature where they have been deformed before, is so far unavoidably linked to erasing this memory effect.

Behl et al (Behl et al: Reversible bidirectional shape-memory polymers, Advanced Materials (2013) 25, p. 4466-4469) describe a reversible bidirectional shape-memory polymer and actuators made thereof. The polymer network comprises two separated crystallizable domains having different melting points $T_m$, namely poly(ε-caprolactone) (PCL) with a melting point at $T_{m,PCL}=34°$ C. and poly(ω-pentadecalactone) (PPD) with a melting point at $T_{m,PPD}=64°$ C. In the programming process, the polymer network is first deformed at a programming temperature $T_{reset}$ while orientating the polymer segments. Subsequently the polymer is cooled to a temperature $T_{low}=0°$ C., with $T_{low}$ being below both melting temperatures $T_{m,PCL}$ and $T_{m,PPD}$. After releasing the deformation stress, the polymer is heated to temperature $T_{high}=50°$ C., which is between the melting temperatures $T_{m,PCL}$ and $T_{m,PPD}$ of the PCL- and PPD-domains. The polymer programmed in this way is capable of reversibly and repeatedly changing its shape between two free-standing shapes under stress-free conditions upon varying the temperature between $T_{low}$ which is below the lower melting point $T_{m,PCL}$ and $T_{high}$ lying between the two melting points $T_{m,PCL}$ and $T_{m,PPD}$ of the PCL- and PPD-domains. In this polymer system, the PCL-domains are responsible for the actuation of the reversible shape shift. On the other hand, the PPD-domains form at $T_{high}$ a skeleton keeping the PCT-actuator segments orientated to stabilize the programmed shape-shifting geometry while providing elasticity to the system. Both functions including actuation and shape stabilization are thus allocated to two chemically different phases.

BRIEF DESCRIPTION OF THE INVENTION

Object of the present invention is to provide a polymer or an actuator consisting of or comprising a polymer capable of reversibly switching between two shapes without the need of renewed process for defining the shapes (programming). The reversible shape shift should be accomplished without application of an external force. In other words, a self-supporting bidirectional shape-memory polymer (hereinafter also referred to as bSMP) shall be provided. In addition, the polymer should have an actuation temperature, i.e. the temperature at which the shape shift occurs, that can be varied by a physical parameter, rather than by chemical variation of the polymer.

These objects are solved by a method of preparing an actuator and a method of its use according to the independent claims. Preferred embodiments of the invention are specified in the dependent claims.

Thus, a first aspect of the invention is directed to a method of preparing an actuator capable of being repeatedly and reversibly shifted between two freestanding shapes (A, B) under stress-free conditions upon varying the temperature between a temperature $T_{low}$ and a temperature $T_{sep}$. The method comprises the steps:

(a) providing an actuator consisting of or comprising a covalently or physically cross-linked polymer network, the polymer comprising a first phase having a thermodynamic phase transition extending in a temperature range from $T_{trans,onset}$ to $T_{trans,offset}$, and an elastic phase having a glass transition temperature $T_g$, with $T_g<T_{trans,onset}$, the polymer having an initial shape, (b) deforming the polymer to a deformation shape at a temperature $T_{prog}$ by applying a stress, where the deformation is adapted to align chain segments of the polymer, (c) setting the polymer to a temperature $T_{low}$ with $T_{low}\leq T_{trans,onset}$ under maintaining the stress as to provide a solidified state of the polymer domains associated with the first phase, (d) heating the polymer to a predetermined separation temperature $T_{sep}$, with $T_{trans,onset}<T_{sep}<T_{trans,offset}$, under stress-free conditions as to melt first polymeric domains (AD) of the first phase having a transition temperature in the range between $T_{trans,onset}$ and $T_{sep}$ and to maintain second domains (SD) of the first phase having a transition temperature in the range between $T_{sep}$ and $T_{trans,offset}$ in the solidified state, thus implementing shape A, where shape A geometrically lies between the initial shape provided in step (a) and the deformation shape applied in step (b) and shape B is the shape at $T_{low}$ and lies geometrically between shape A and the shape of deformation of step (b).

A further aspect of the present invention is directed to a method of using the actuator obtained by the preparation method of the first aspect. The method of using comprises repeating the steps:

(e) reducing a material temperature of the polymer to a temperature $T_{low}$, with $T_{low} \leq T_{trans,offset}$ under stress-free conditions thus causing a shape-shift from shape A to shape B, wherein shape B corresponds to a shape that geometrically lies between the deformation shape provided in step (b) and shape A provided in step (d);

(f) increasing a material temperature of the polymer to temperature $T_{sep}$ with $T_{trans,onset} < T_{sep} < T_{trans,offset}$ under stress-free conditions thus causing a shape-shift from shape B to shape A.

The preparation method according to the first aspect is also referred to as "programming module", while the method of using the actuator according to the second aspect is also referred to as "reversibility module". In the programming module, the shape-retaining phase is brought into a shape A by deforming at various temperatures, which also includes cold drawing, and then heating to $T_{sep}$. In the reversibility module, the temperature is cyclically switched between $T_{sep}$ and a temperature $T_{low}$, which is below the solidification temperature of the first domains AD. The material takes shape B at $T_{low}$. The reversibility module can be performed successively any number of times such that the polymer switches between shapes A and B. The temperature at which the shape change is greatest and which can be determined, for example, from the derivation of the strain, is also called actuation temperature $T_{act}$. A correlation between $T_{sep}$ and $T_{act}$ is found in polymers which have been subjected to the programming procedure according to the invention. Thus the polymer has a reversible temperature-memory effect rTME.

The polymer obtained by the programming module is capable of reversibly changing its shape without applying a mechanical stress to the material. The shape change therefore occurs between two freestanding shapes A and B and is solely driven by temperature. Moreover, polymer stores the temperature at which it was deformed reversibly without requiring reprogramming. It is thus referred to as reversible temperature-memory polymer (rTMP).

The invention solves the technical problem of reversibility, while simultaneously maintaining the shape by the preparation of a multiphase polymer system, in which one phase (hereinafter referred to as skeleton domains SD) is responsible for maintaining the shape, whereas the other phase (hereinafter referred to as actuator domains AD) functions as a reversible actuator. Until now, in conventional unidirectional SMPs one phase (the switching phase) has been used both for shape maintenance and actuation. The invention solves the problem by assigning the two functions to different phases (or transition temperature ranges) which are covalently or physically interconnected at the molecular level.

In contrast to the invention, stress-free shape-memory polymers known in the art require a renewed programming of the temporary shape once the shape-memory effect has been induced, i.e., they are unidirectional. Until now, applying a constant stress has been a prerequisite for a successful reversible switching of polymers.

Without being bound to theory, it is assumed that the second domains SD form a skeleton which is at least partially embedded in the first domains AD and polymer chain segments forming the first domains AD and the second domains SD are substantially aligned or orientated in a common direction. In the present concept, the skeleton forming domains SD and the actuator forming domains AD are interchangeable, i.e. they are chemically identical and are both associated to the broad thermal transition ranging from $T_{trans,onset}$ to $T_{trans,offset}$. By appropriately selecting the separation temperature $T_{sep}$ within this temperature range, the individual polymer domains associated to $T_{trans}$ are separated and assigned to two different functional groups. The first group SD allows the actuator to maintain an overall (shape changing) geometry and is associated to a transition temperature in the upper range of $T_{sep}$ to $T_{trans,offset}$. The second group AD associated to a transition temperature in the lower range of $T_{trans,onset}$ to $T_{sep}$ drives the shape shift of the actuator between two shapes A and B which are determined by the overall geometry of the actuator. The elastic phase having the glass transition at $T_g$ ensures the material to have appropriate elasticity allowing the change in shape.

In other words, the invention solves the technical problem of reversibility and simultaneous shape and temperature memory functionality by providing a multiphase polymer system in which one phase (i.e. the phase having the phase transition extending from $T_{trans,onset}$ to $T_{trans,offset}$) is responsible for the shape and temperature-memory while the other phase (i.e. the phase having the glass transition at $T_g < T_{trans,onset}$) provides the elasticity required for actuation. In addition, the phase that is responsible for the shape and temperature memory is split into two ranges by selecting a temperature $T_{sep}$. The range of domains that is crystalline or glassy above $T_{sep}$ assumes the function of retaining the geometry even if no mechanical stress is applied. The range of domains that solidify or melt below $T_{sep}$ assumes the function of actuation and thus enables the temperature-memory. Previous temperature-memory polymers only used the range below $T_{sep}$ for both retaining the shape and actuation. The present invention solves the problem in that the two functions are assigned to different phase transition ranges, which however are linked at molecular level. These corresponding domains can be linked either via covalent net points or via entanglements (physical net points).

The polymer as provided in step (a) has an initial geometry which is determined by the initial manufacture of the polymer which may be achieved by any common molding techniques, such as injection molding, press molding or blow molding etc. If the polymer is a thermoplastic, i.e. it has non-covalent, physical cross-links, the initial shape can be remolded. If, on the other hand, the polymer is a covalently cross-linked network, the initial shape can only be changed by machining.

Shape A, which is the shape at $T_{sep}$, is determined by the programming procedure as described above and geometrically lies between the initial shape of the polymer as provided in step (a) and the shape of deformation applied in step (b). Shape B, on the other hand, which is the shape at $T_{low}$, is geometrically located between shape A and the shape of deformation of step (b). In other words, both shape A and shape B are located between the initial shape and the deformation shape, where shape A is closer to the initial shape and shape B is closer to the deformation shape. For instance, when the initial shape is a straight ribbon having a length $L_i$ and the deformed shape is an elongated ribbon having a length $L_d$ obtained by stretching the ribbon in step (b), shape A will be a ribbon having a length $L_A$ and shape B will be a ribbon having a length $L_B$, with $L_i<L_A<L_B<L_d$. The difference between shapes A and B during the shape-shift, here the difference between $L_A$ and $L_B$, depends on $T_{sep}$ since the weight ratios of the domains allocated to the actuation and to the skeleton-forming domains AD, SD are adjusted by variation of $T_{sep}$. The lower $T_{sep}$ is, the smaller the fraction of domains allocated to the actuation domains AD and the higher the fraction of domains allocated to the skeleton domains SD. As the change in shape upon cooling to $T_{low}$, here the increase in length, is mainly driven by the increase in the inter-chain distances between the aligned polymer segments during solidification, a decrease of $T_{sep}$ will lead to smaller difference between shape A and shape B and thus to a smaller degree of the shape shift. Similarly, a higher $T_{sep}$ will lead to a higher difference between shapes A and B and thus to a higher degree of the shape shift.

However, providing a minimum distance of $T_{sep}$ to $T_{trans,offset}$ is required in order to ensure an appropriate fraction of domains allocated to the skeleton domains SD and hence to ensure appropriate stabilization of the overall shape. Similarly, providing a minimum distance of $T_{sep}$ to $T_{trans,onset}$ is required in order to ensure an appropriate fraction of domains allocated to the actuation domains AD and hence a suitable degree of actuation. It is thus preferred that a distance between $T_{sep}$ to $T_{trans,onset}$ and/or to $T_{trans,offset}$ is at least 5 K, in particular at least 10 K, and even more preferred at least 15 K.

It should be noted that the temperature $T_{low}$ applied in the reversibility cycle is not necessarily the same as the temperature $T_{low}$ applied in the programming cycle for fixation of the programmed shape, as long it is below $T_{trans,onset}$ in order to ensure complete solidification of the actuation domains AD. Similarly, the separation temperature $T_{sep}$ applied in the programming and reversibility cycle may differ from each other as long it is appropriately selected within the transition temperature range. According to a preferred embodiment, the separation temperature $T_{sep}$ applied in subsequent reversibility cycles in varied. In this way, the fraction of domains associated to the skeleton and actuation domains is varied resulting in both, varying actuation temperatures $T_{act}$ and varying magnitudes of actuation.

The actuator may be re-programmed, thus implementing a new shape- and temperature-memory. This means that shape A and thus shape B may be "erased" by repeating steps (b) to (d) and selecting another deformation to implement new shapes A' and B'.

According to a preferred embodiment, the temperature $T_{sep}$ is predetermined such as to implement a desired actuation temperature $T_{act}(A \rightarrow B)$ or $T_{act}(B \rightarrow A)$. The actuation temperature $T_{act}(A \rightarrow B)$ is the temperature at which the maximum rate of the shape-shift from shape A to shape B occurs upon heating, while $T_{act}(B \rightarrow A)$ is the temperature at which the maximum rate of the shape-shift from shape B to shape A occurs upon cooling. The inventors have found that the separation temperature $T_{sep}$ correlates with the actuation temperature $T_{act}$. The higher the separation temperature $T_{sep}$ the higher the actuation temperature $T_{act}$ is, and vice versa. In other words, the polymer "remembers" $T_{sep}$ selected during the implementation of shape A in step (d). This capability is called temperature-memory and the corresponding actuator equipped with this capability is also referred to as "temperature-memory actuator". The actuation temperature $T_{act}$ implemented in this way is maintained over many actuation cycles or even permanently.

In connection with the aforementioned embodiment, the predetermination of the separation temperature $T_{sep}$ may preferably be effected using an empirically determined characteristic map correlating the separation temperature $T_{sep}$ and the actuation temperature $T_{act}(A \rightarrow B)$ or $T_{act}(B \rightarrow A)$ or using an empirically determined mathematical relationship between the separation temperature $T_{sep}$ and the actuation temperature $T_{act}(A \rightarrow B)$ or $T_{act}(B \rightarrow A)$. The characteristic map or the mathematical relationship may be obtained for the respective polymer system by test series which vary the separation temperature $T_{sep}$ and determining the resulting actuation temperature $T_{act}$. Once the mathematical relationship or the characteristic map is available, it enables the user to select the corresponding separation temperature $T_{sep}$ as a function of the desired actuation temperature $T_{act}$.

As already mentioned above, the difference between shape A and shape B and thus the magnitude of actuation depends on the separation temperature $T_{sep}$. Thus, according to a preferred embodiment, the separation temperature $T_{sep}$ is predetermined such as to set a desired degree (or magnitude) of actuation during the shape-shift from shape A to shape B and from shape B to shape A, respectively. The closer $T_{sep}$ to $T_{trans,onset}$, the smaller the degree of actuation will be. Likewise, the closer $T_{sep}$ to $T_{trans,offset}$, the higher the degree of actuation will be.

In connection with the last embodiment, the predetermination of the separation temperature $T_{sep}$ may preferably effected using an empirically determined characteristic map correlating the separation temperature $T_{sep}$ and the degree of actuation during the shape-shift between shape A and shape B or using an empirically determined mathematical relationship between the separation temperature $T_{sep}$ and the degree of actuation during the shape-shift between shape A and shape B. The characteristic map or the mathematical relationship may be obtained for the respective polymer system by test series which vary the separation temperature $T_{sep}$ and determining the resulting degree of actuation, i.e. the magnitude of the shape-shift. Once the mathematical relationship or the characteristic map is available, it enables the user to select the corresponding separation temperature $T_{sep}$ as a function of the desired degree of actuation.

The polymer used in the actuator according to the present invention has preferably a broad transition range spanning between $T_{trans,onset}$ and $T_{trans,offset}$. The distance between $T_{trans,onset}$ and $T_{trans,offset}$ is preferably at least 20 K, particularly at least 50 K, most preferably at least 100 K.

The polymer used in the actuator is not limited to a special polymer and may have crystalizable segments or amorphous segments which can be solidified by vitrification. Accordingly, the thermodynamic phase transition of first phase may correspond to a crystallization transition ($T_{trans}=T_m$) or a glass transition ($T_{trans}=T_g$) of the first phase, preferably to a crystallization transition. Examples of crystallizable segments comprise polyethylene (PE), polypropylene (PP), polyamides (PA) for example nylon 6, polyesters such as polyethyleneterephthalat (PET), polypropyleneterephthalat (PPT), polycaprolacton (PCL), polylactic acid (PLA), polycarbonates (PC), polyoxymethylene (POM), polytetraflouethylene (PTFE), polyetheretherketone (PEEK), polyolefins, polyurethanes (PUR) and copolymers as well as blends of these. Examples of amorphous segments comprise polystyrene (PS), polyvinylchlorid (PVC), acrylnitril-butadiene-styrene (ABS) block copolymers, polyvinylacatat (PVAc), polyvinylalcohol (PVA), sulfonated tetrafluoroethylene based fluoropolymer-copolymer (PFSA or Nafion), polyvinylpyrrolidon (PVP), polyolefins, polyesters, polyethers, polyurethanes and copolymers as well as blends of these.

Optionally, the polymeric part of the article may be a composite material composed of the polymer network and a particulate material embedded therein enabling indirect heating of polymer or the article instead of raising the ambient temperature. Thus, according to a preferred embodiment the article consists of or comprises a composite material composed of the polymer network (rTMP) and a particulate material embedded therein. The particulate material may be selected from magnetic particles, electrically conductive particles and infrared sensitive particles.

Accordingly, in the method of producing the article (programming module) and/or in the method of using the article (reversibility module), the temperature of the polymer may be increased from $T_{low}$ to temperatures above $T_{trans,offset}$ in the programming module and $T_{low}$ to $T_{sep}$ in the reversibility module directly by increasing the ambient temperature. Alternatively, in case the article comprises a composite material of the polymer network and magnetic or electrically conductive or IR sensitive particles, the temperature may be increased indirectly, e.g. by applying an alternating magnetic field or electric current or infrared radiation.

The deformation of the actuator in step (b) should be adapted to align (or orientate) chain segments of the polymer. Aligning or orientation means to arrange the chain segments at least partially according to a common spatial direction, i.e. in a substantially parallel manner. As a stretching of the polymer is suitable to achieve such an orientation, the deformation action preferably includes in at least on local point of the polymer a stretching deformation. Preferably the deformation comprises elongation, compression, torsion or bending of the actuator or any combination thereof.

With respect to the programming temperature $T_{prog}$ used in step (b), there are three general approaches:

i) According to the first approach, the deformation of the polymer in step (b) occurs at a temperature $T_{prog}$, with $T_{prog} > T_{trans,offset}$, so that the whole polymer is in a rubbery-elastic state. In this case, step (c) comprises cooling the polymer to the temperature $T_{low}$ as to solidify the first polymer phase giving rise to the phase transition $T_{trans}$.

ii) Alternatively, the deformation of the polymer in step (b) may occur at a temperature $T_{prog}$, with $T_{trans,onset} < T_{prog} \leq T_{trans,offset}$, so that the polymer is in a semi-solidified state, for instance in a semi-crystalline state in case of $T_{trans} = T_m$. Here, step (c) comprises cooling the polymer to the temperature $T_{low}$. In the temperature range between $T_{trans,onset}$ and $T_{trans,offset}$ the solidity and stability, and usually also the stretchability and tensile strength, of the material increases with decreasing $T_{prog}$. Thus, a higher degree of elongation than in the rubbery-elastic state in i) can be applied in this range.

iii) Lastly, the deformation of the polymer in step (b) may be done at a temperature $T_{prog}$, with $T_{prog} \leq T_{trans,onset}$, so that the polymer is in a solidified state. In this case, step (c) comprises heating the polymer to the temperature $T_{low}$ or maintaining the polymer at the temperature $T_{low}$. Preferably, temperature $T_{prog}$ is equal or below $T_{low}$. This technique is called "cold-drawing" or "cold-deformation". During cold-drawing, the solidified domains are disrupted by the application of mechanical stress resulting in smaller solidified domains, for instance crystallites in case the first phase has a crystallization/melting phase transition ($T_m$). When the polymer is in the solidified state at $T \leq T_{trans,onset}$, the material can be plastically deformed and a higher degree of elongation than in i) or ii) can be applied.

A further aspect of the present invention is directed to a manufacture process and corresponding apparatus set-up for preparing the actuator according to the invention. The apparatus set-up of this in-line processing comprises extruding means for blending and melting the polymer components or corresponding monomers or macromers and optionally further components, such as cross-linking agents, initiators, additives etc. The extruding means preferably comprise a twin screw extruder. The apparatus set-up may further comprise at least one curing zone, arranged downstream of the extruding means, for cross-linking and/or polymerizing the polymer. The curing zone may comprise UV radiation means, heating means, electron beam means and/or gamma irradiation means. The apparatus set-up may further comprise first thermostatting means, arranged downstream of the curing zone, for bringing the cured polymer to a desired programming temperature $T_{prog}$. The apparatus set-up further comprises deformation means, arranged downstream of the curing or first thermostatting means, for adjusting a desired material deformation, particularly a desired extension ratio of the cured polymer. The deformation means preferably include elongation means for stretching the polymer, for instance one or more pairs of haul-off rollers. The apparatus set-up further comprises second thermostatting means, arranged downstream of the deformation means, for bringing the cured and deformed polymer to a desired fixation temperature $T_{low}$. The second thermostatting means may comprise cooling zone for bring the material to ambient temperature. The apparatus set-up further comprises material collecting means, for collecting the programmed polymer. The collecting means may comprise a spooler for winding up the polymer. The TME actuator is thus manufactured as an endless structure of a film, fiber or tube. Optionally, instead of the collecting means a cutting means may be provided for tailoring the endless material into desired pre-cut parts.

The process and apparatus set-up allows in one integral in-line extrusion process to prepare covalently cross-linked polymer actuators equipped with a reversible bidirectional temperature-memory effect. The process allows programming at different temperatures, including cold drawing, and different strain ratios. The material of interest can be processed in the form of films or fibers or tubes with various dimensions.

A further aspect of the present invention is directed to an actuator obtainable by the preparation method of the present invention. As the actuator is equipped with a reversible "temperature-memory effect" rTME with respect to its actuation temperature $T_{act}$ as well as to its degree of actuation between shapes A and B which both depend from $T_{sep}$, the actuator is also referred to as temperature-memory actuator.

The actuator comprises the polymer network as a functional part or completely consists of the polymer network. When the actuator comprises the polymer network as a functional part, other parts are present beside the polymer network part. The polymer network may have any overall geometry, comprising films or sheets, filaments, tubes or more compact structures, such as rods. Also more complex shapes and or combinations of the aforementioned shapes may be realized.

It is assumed that the subject matter of the invention can be used for many fields of application, since it represents a general principle.

For instance, the actuator may be a textile made of polymeric filaments or fibers obtained by the present preparation method. The textile reversibly contracts and relaxes depending on the temperature. In this way, the porosity of the textile or the compression is changed depending on the temperature. Moreover, the actuation temperature as well as the magnitude of actuation can be varied simply by varying $T_{sep}$.

Another application comprises any types of reversible closing systems, switches, and actuators. For instance, building facades or window shades capable of controlling the degree of darkening according to the temperature can be produced from the actuators according to the invention. In these cases, the actuator may comprise an actuating part made from the polymer network and which is driven by temperature and further parts, such as housings, frames, fastening means etc. It could be demonstrated, that these materials are suitable as actuators for actuation over several hundred cycles.

Other applications are directed to medical implants such as stents, fixation devices, dental posts or porous foam structures applied as scaffolds for tissue engineering or regeneration.

The invention further relates to applications of the inventive rTMPs. They comprise, e.g.:
fibers, functional textiles, fabrics with rTME for industrial, medical or sport applications (e.g. elastic stockings or other elastic textiles that can be put on when they are widened and that exhibit their reversible compression effect when they are warmed up to body temperature);
films, reusable shrink films, films that can be deposited onto textiles;
medical products, such as medical catheters, tubing, tubes that can move;
reversible anchorable implants (e.g. magnetically switchable cPEVA nanocomposites);
thermally switchable systems that release active substances;
reversibly switchable microparticles, microstructures;
reversibly switchable porous rTMP structures, such as foams;
printable rTMP precursors;
devices (heat engines) for the storage/conversion of heat/temperature differences into motion (motors);
household goods, e.g. reversibly sealable receptacles.

The temperature expansion behavior of polymers equipped with an rTME is opposed to that of conventional plastic materials, i.e. the polymer expands when heated and contracts upon cooling. Therefore, the polymer processed according to the invention may be used in applications that are aimed at compensating the classic thermal expansion/contraction pattern of conventional plastics at large temperature differences.

Many other uses and applications of the actuator according to the invention are possible.

The invention will hereafter be discussed in more detail in connection with specific embodiments and the following figures:

FIG. 1 Scheme of the implementation and the application of a bidirectional shape-memory effect (bSME): After deformation at $T_{prog}$ the skeleton domains (SD), which determine the shape shifting geometry, are crystallized/vitrified by cooling and subsequent heating to $T_{sep}$ (programming procedure). The bSME is triggered by the reversible crystallization/vitrification and melting of oriented actuator domains (AD). Black dots symbolize cross-links.

Figure 2:
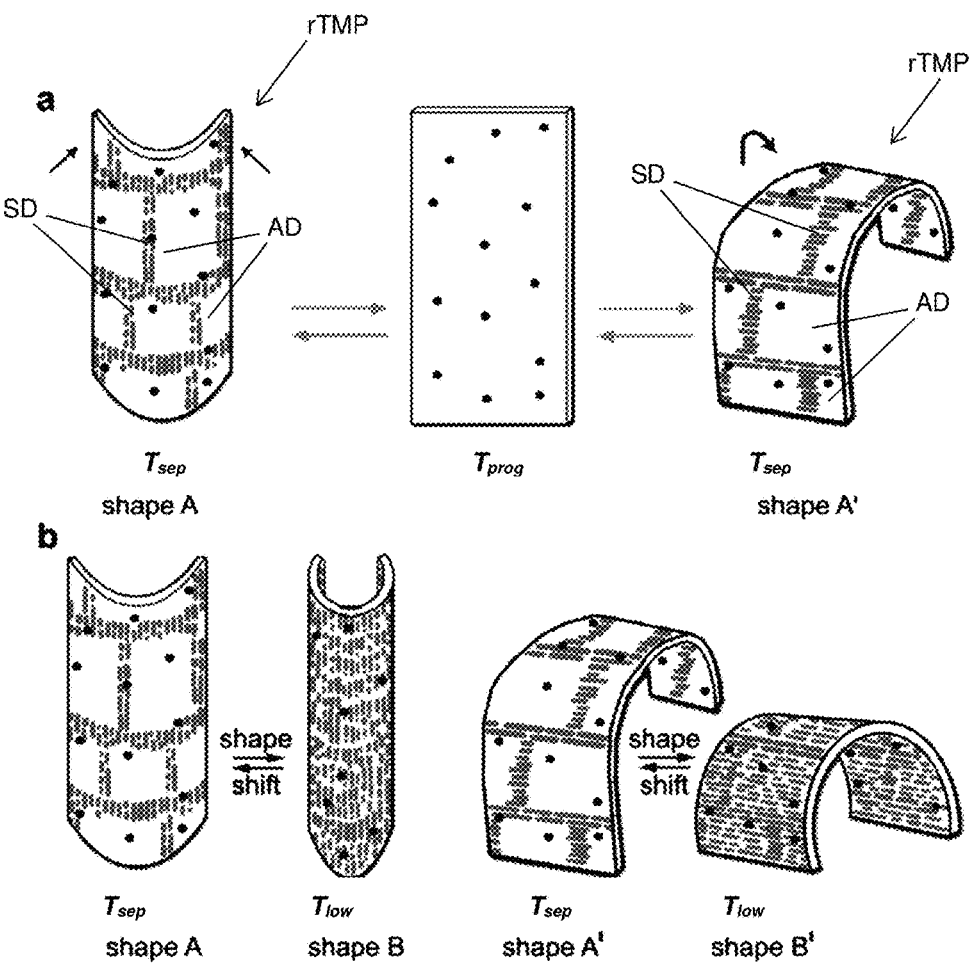

FIG. 2 Working principle of a bSMP. (a) Programming: the overall appearance is determined by the directed crystallization/vitrification of the internal skeleton forming domains (SD). ●: chemical cross-links, ┄: steps of transformation. (b) Actuation: reversible shape shifts by crystallization/melting or vitrification/melting of oriented polymer segments in the actuation domains (AD).

Figure 3:
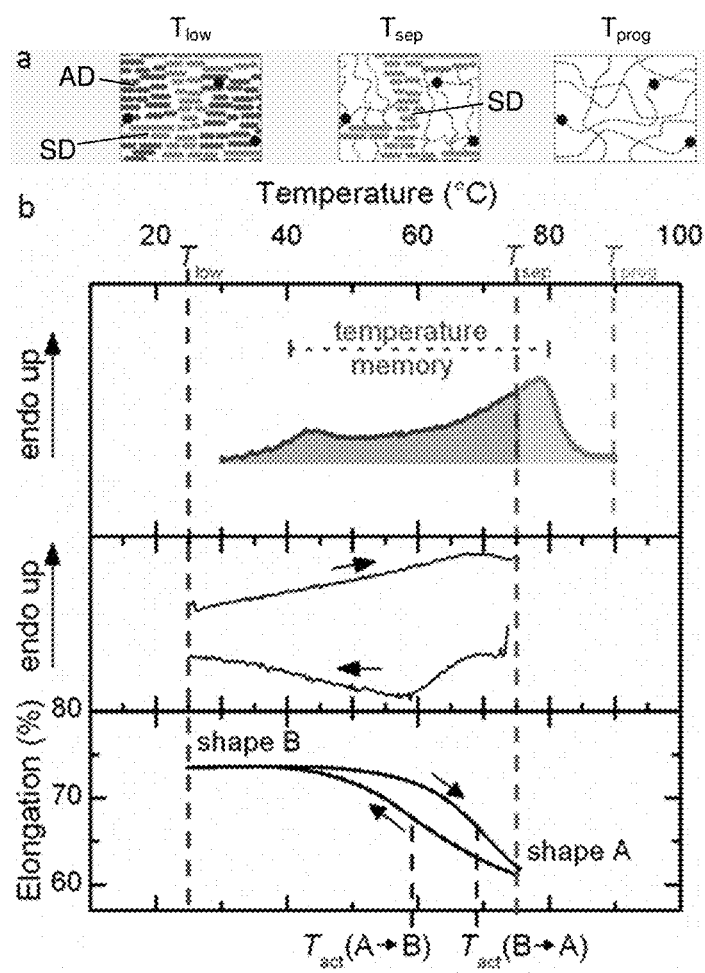

FIG. 3 cPEVA actuator: (a) schematic structure of cPEVA at $T_{low}$, $T_{sep}$ and $T_{prog}$; (b) thermal and thermo-mechanical investigations: DSC plot of non-programmed cPEVA during melting (top), DSC plot of programmed cPEVA during the first reversible actuation cycle (middle), elongation-temperature-plot during the first reversible actuation cycle (bottom).

Figure 4:
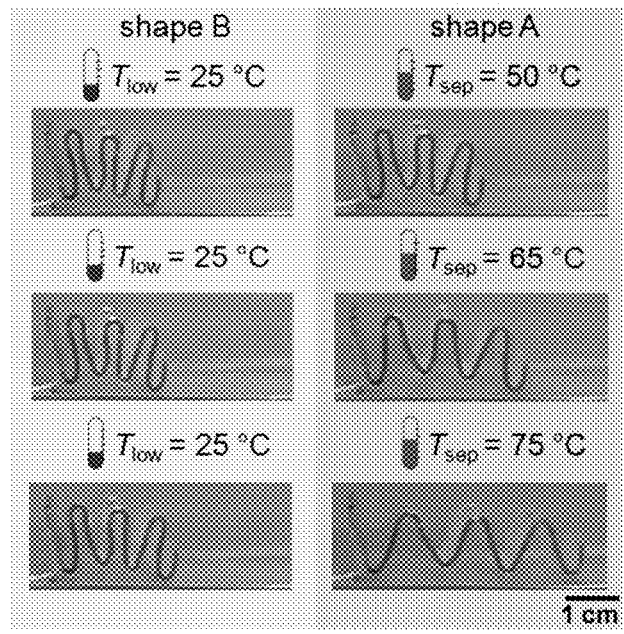

FIG. 4 Photo series of a cPEVA actuator demonstrating its temperature-memory actuation capability. The actuator was programmed to have a concertina appearance and repeatedly cooled to a constant $T_{low}=25°$ C. and heated to varying $T_{sep}=50°$ C., 65° C. and 75° C.

Figure 5:
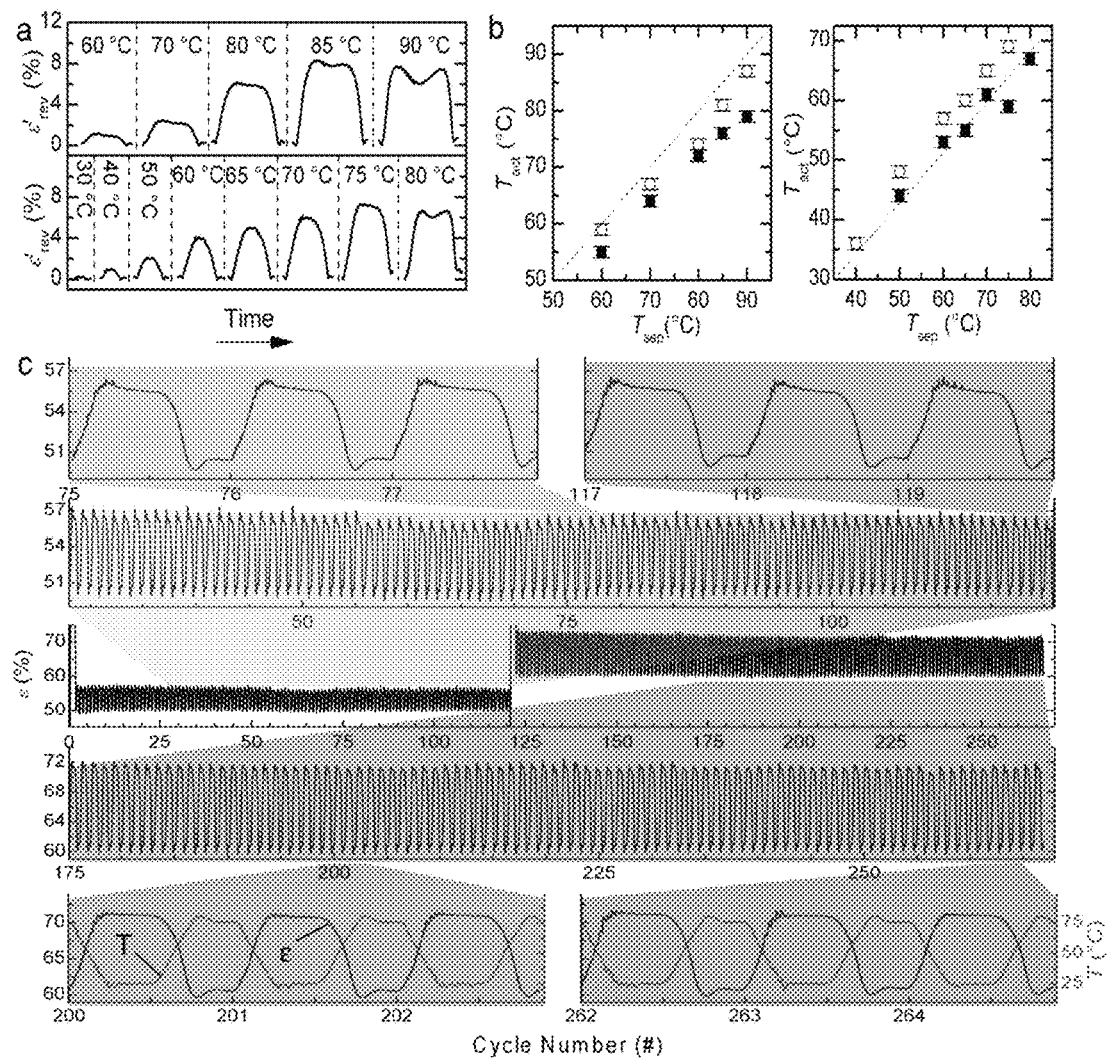

FIG. 5 Quantification of the shape-shifting capability of cPEVA with 10 and 20 wt % VA content in cyclic, thermo-mechanical tensile tests: (a) Relative reversible elongation $\epsilon'_{rev}$ as function of time (Top: cPEVA10d20, Bottom: cPEVA20d20); (b) Correlation between $T_{sep}$ and the actuation temperatures upon cooling $T_{act}(A\rightarrow B)$ and heating $T_{act}(B\rightarrow A)$ (($T_{act}(A\rightarrow B)$: filled squares, $T_{act}(B\rightarrow A)$: hollow circles); left: cPEVA10d20, right: cPEVA20d20); (c) Elongation versus cycle number plot in a long term study of actuation cycles of cPEVA20d20 applying $T_{sep}=75°$ C. with 120 cycles with $\epsilon_{ssp}=100\%$ and 130 cycles with $\epsilon_{ssp}=150\%$.

Figure 6:
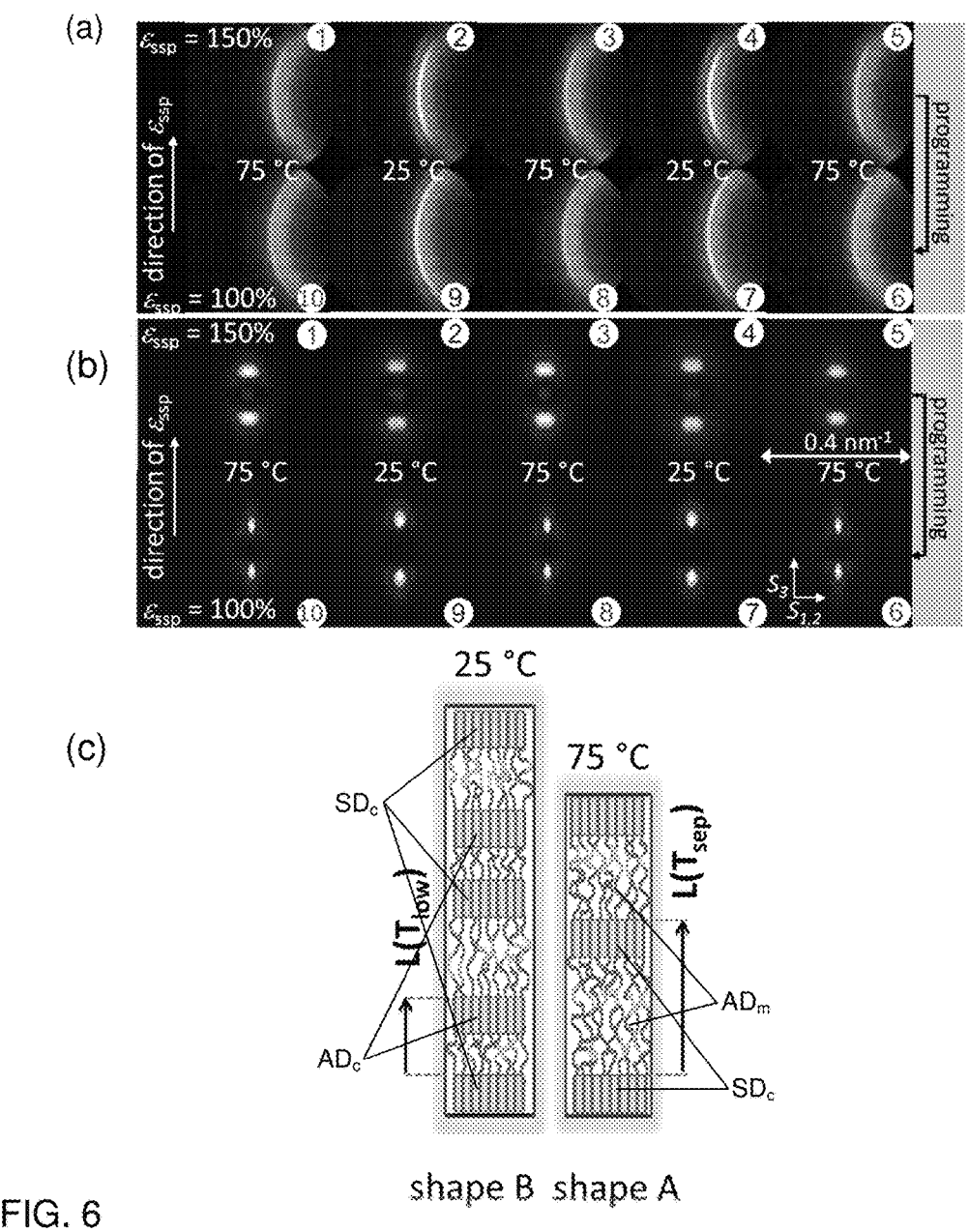

FIG. 6 Structural changes occurring during the bidirectional actuation of a programmed cPEVA20d20 ribbon. (a) Changes of the scattering pattern determined by 2D Wide Angle X-ray Scattering (SAXS) and (b) 2D Small Angle X-ray Scattering (SAXS) recorded for shapes A and B as well as for shapes A' and B' after (re)programming and in subsequent reversible actuation cycles. ($T_{sep}=75°$ C., $T_{low}=25°$ C., upper series $\epsilon_{ssp}=150\%$, lower series $\epsilon_{ssp}=100\%$). Numbers indicate steps during experiment. (c) Changes of longperiods schematically shown for cPEVA during bidirectional actuation.

Figure 7:
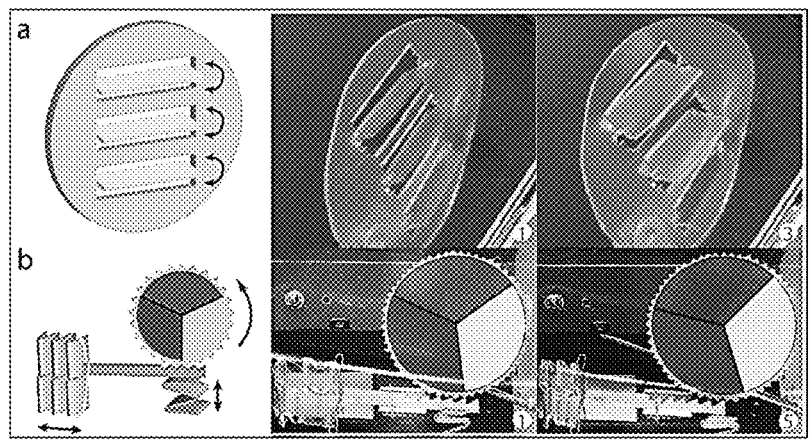

FIG. 7 Heat-memory actuators made of cPEVA: (a) programmable window shades, (b) heat engine driven by a concertina shaped cPEVA drive element.

Figure 8:
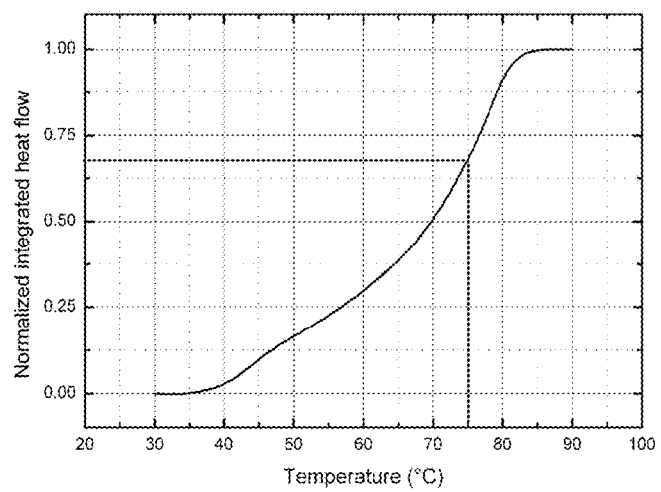

FIG. 8 DSC investigations of cPEVA with 20 wt % vinyl acetate. Normalized integral of first heating as a measure for the crystallinity at $T_{sep}$.

Figure 9:
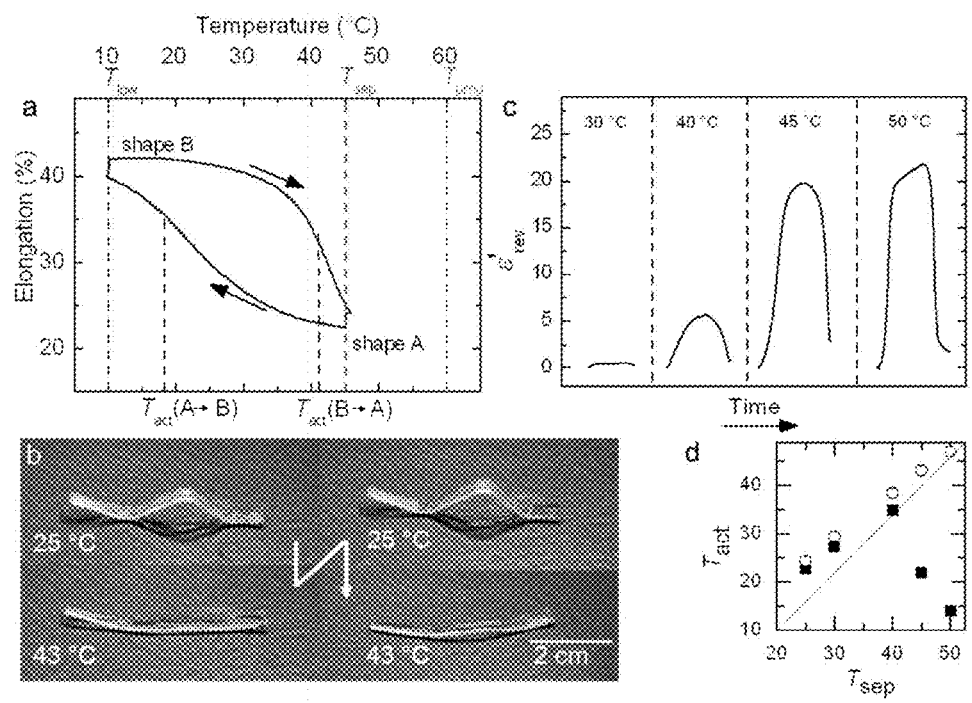

FIG. 9 Studies on polyester-based copolymer network cPCLBA: (a) Elongation versus temperature plot for a representative actuation cycle; (b) Photo series of a ribbon from cPCLBA reversibly changing between two shapes. (c) Relative Elongation $\epsilon'_{rev}$ as a function of time for various $T_{sep}$. (d) Correlation between $T_{sep}$ and the actuation temperatures upon cooling $T_{act}(A\rightarrow B)$ and heating $T_{act}(B\rightarrow A)$ (($T_{act}(A\rightarrow B)$: filled squares, $T_{act}(B\rightarrow A)$: hollow circles).

Figure 10:
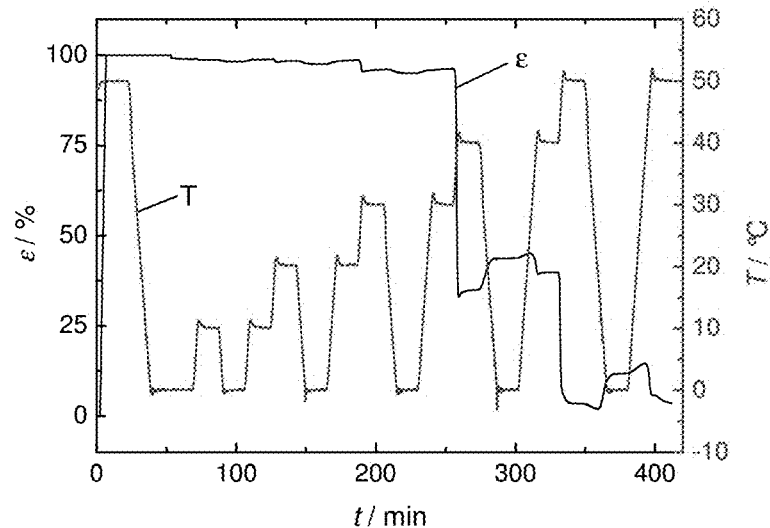

FIG. 10 rTME in a covalent network of poly($\epsilon$-caprolactone) and cyclohexyl methacrylate PCL(85)PCHMA(15): $\Sigma_b=\sim150\%$, $T_m=39°$ C., $\Delta T_m\sim40$ K, $\epsilon_{ssp}=100\%$.

Figure 11:
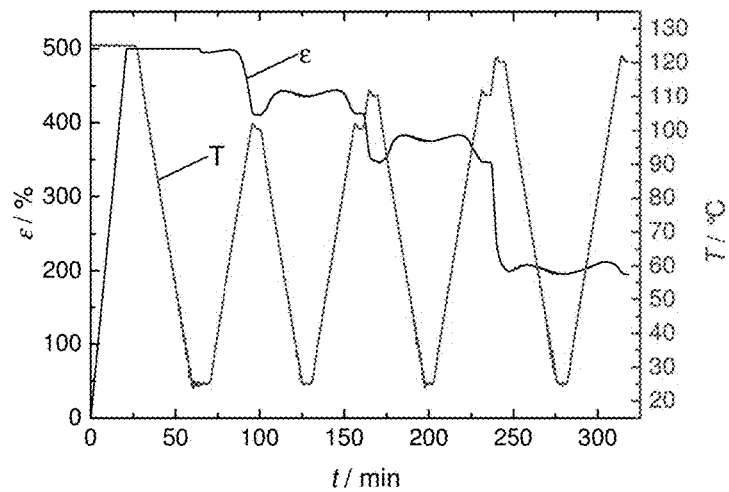
Figure 11:
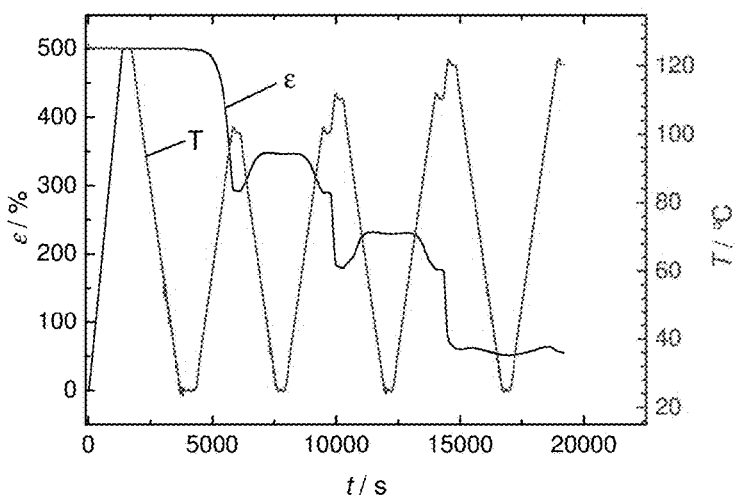

FIG. 11 rTME in cross-linked a blend of polyethylene and poly(ethylene-co-octene) with (a) 1 wt % of cross-linking agent and (b) 2 wt % of cross-linking agent.

Figure 12:
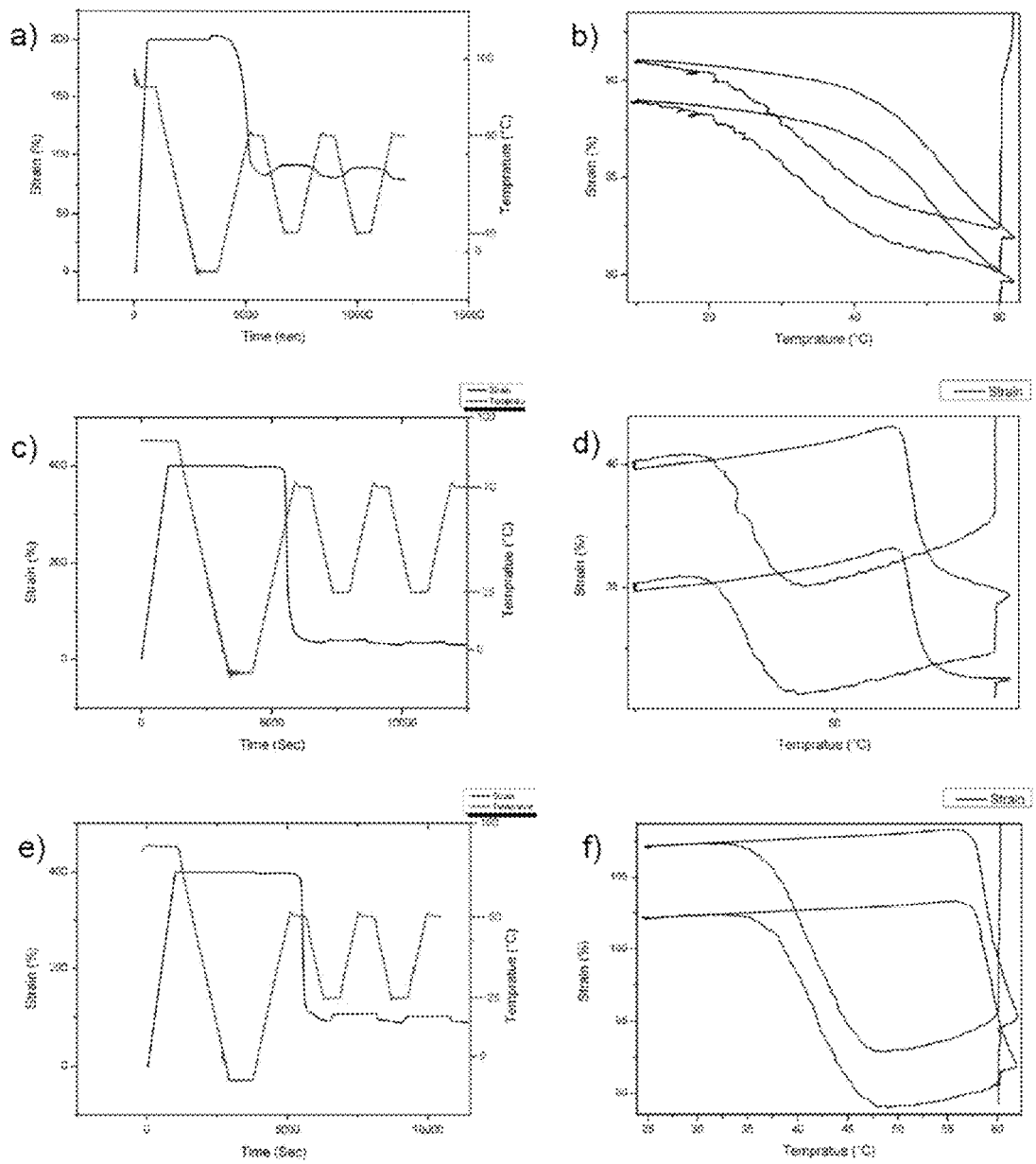

FIG. 12 rTME in covalent networks of PEMAGMA, left: $\epsilon$-t-plots right: $\epsilon$-T-plots; (a)-(b) single polymer cPEMAGMA with $T_{prog}=85°$ C., $T_{low,fix}=-10°$ C., $T_{sep}=60°$ C. and $T_{low}=10°$ C.; (c)-(d) cross-linked polymer blend c(PEMAGMA/PCL) with $T_{prog}=90°$ C., $T_{low,fix}=-10°$ C., $T_{sep}=70°$ C. and $T_{low}=25°$ C., (e)-(f) cross-linked polymer blend c(PEMAGMA/PCL) with $T_{prog}=90°$ C., $T_{low,fix}=-10°$ C., $T_{sep}=60°$ C. and $T_{low}=25°$ C., whereas perforce was 30 mN and 20 mN force was applied during reversibility cycles.

Figure 13:
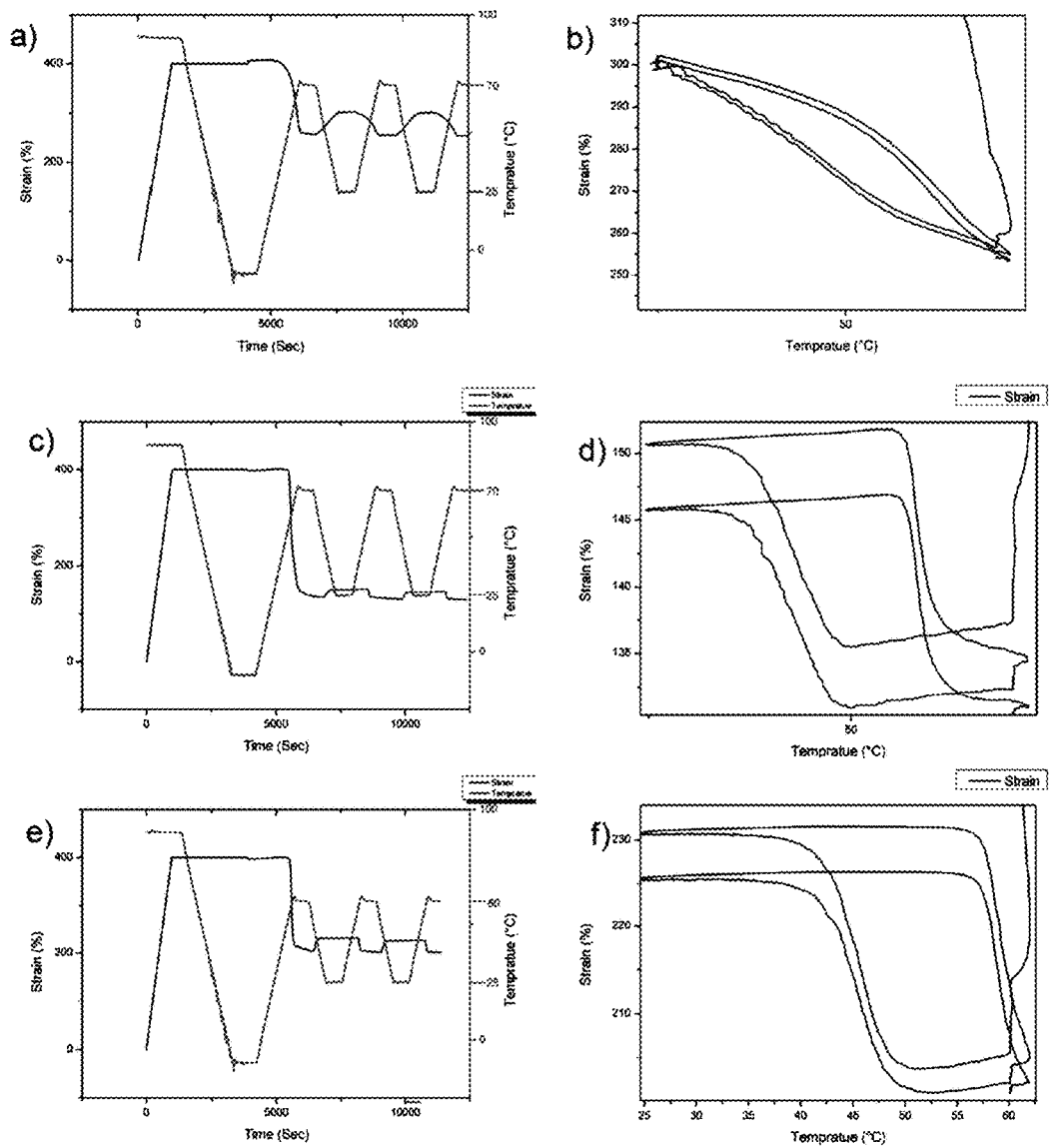

FIG. 13 rTME in covalent networks of PEAEMA, left: $\epsilon$-t-plots right: $\epsilon$-T-plots; (a)-(b) single polymer cPEAEMA with $T_{prog}$=90° C., $T_{low,fix}$=−10° C., $T_{sep}$=70° C. and $T_{low}$=25° C.; (c)-(d) cross-linked polymer blend c(PE-AEMA/PCL) with $T_{prog}$=90° C., $T_{low,fix}$=−10° C., $T_{sep}$=70° C. and $T_{low}$=25° C., (e)-(f) cross-linked polymer blend c(PEMAGMA/PCL) with $T_{prog}$=90° C., $T_{low,fix}$=−10° C., $T_{sep}$=60° C. and $T_{low}$=25° C., whereas perforce was 30 mN and 20 mN force was applied during reversibility cycles.

Figure 14:
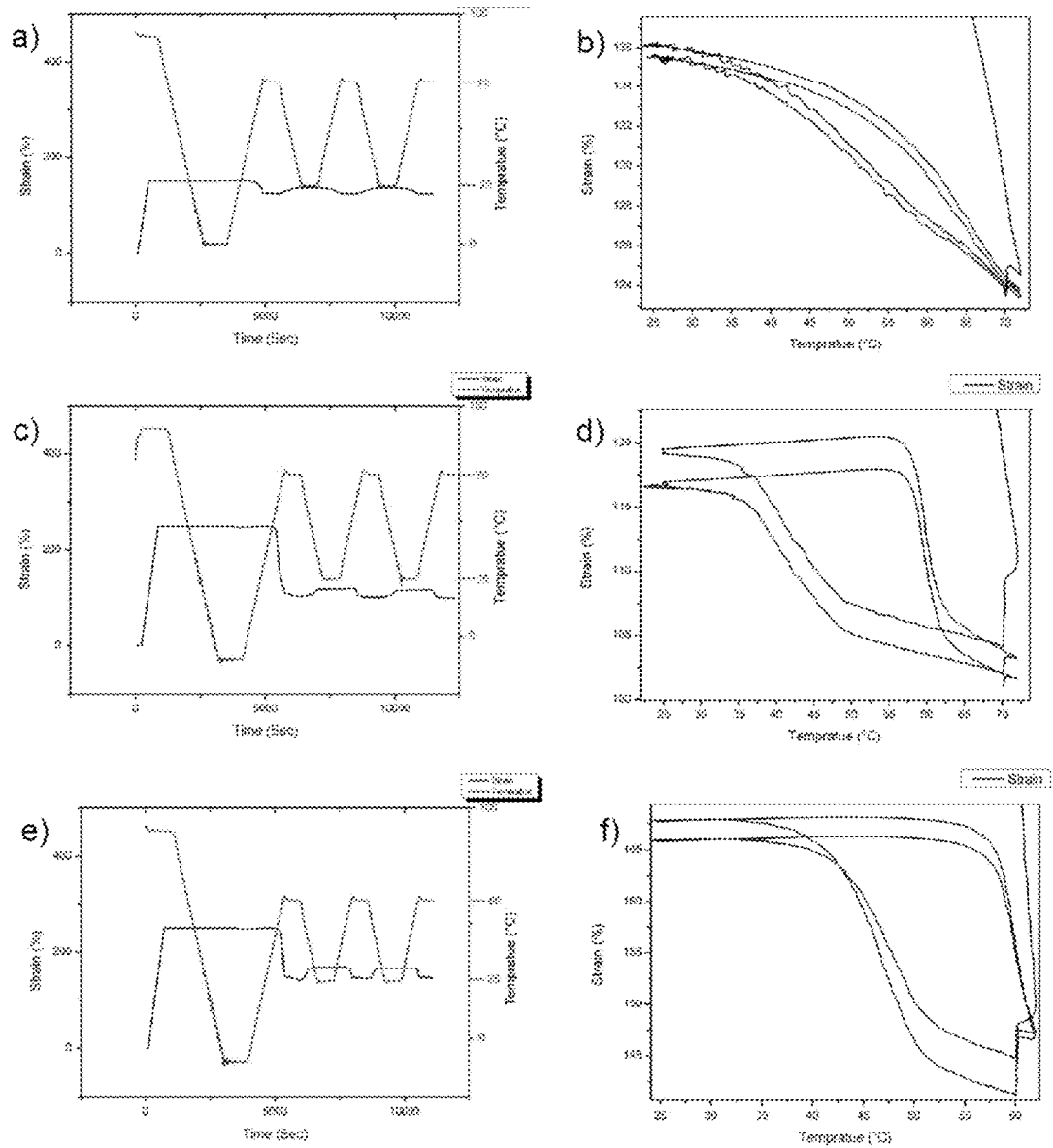

FIG. 14 rTME in covalent networks of PEVA, left: ε-t-plots right: ε-T-plots; (a)-(b) single polymer cPEVA with $T_{prog}$=90° C., $T_{low,fix}$=0° C., $T_{sep}$=70° C. and $T_{low}$=25° C.; (c)-(d) cross-linked polymer blend c(PEVA/PCL) with $T_{prog}$=90° C., $T_{low,fix}$=−10° C., $T_{sep}$=70° C. and $T_{low}$=25° C., (e)-(f) cross-linked polymer blend c(PEVA/PCL) with $T_{prog}$=90° C., $T_{low,fix}$=−10° C., $T_{sep}$=60° C. and $T_{low}$=25° C., whereas perforce was 30 mN and 20 mN force was applied during reversibility cycles.

Figure 15:
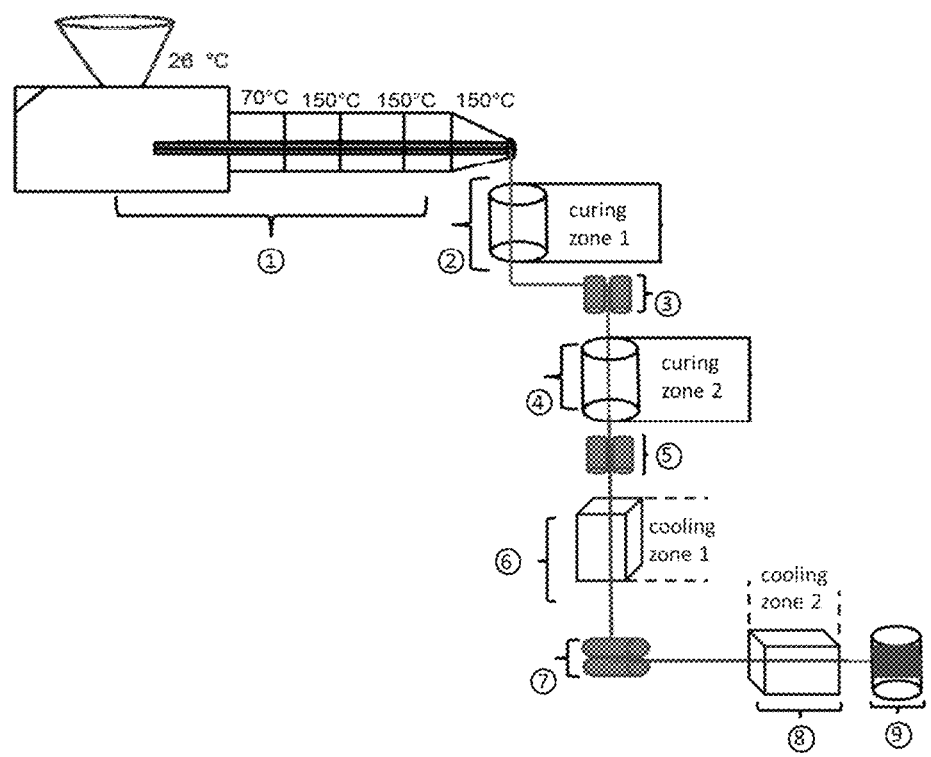

FIG. 15 Schematic drawing of the integrated in-line extrusion apparatus for covalently cross-linking of thermoplastic polymers and equipping of the cross-linked material of interest with an rTME.

Figure 16:
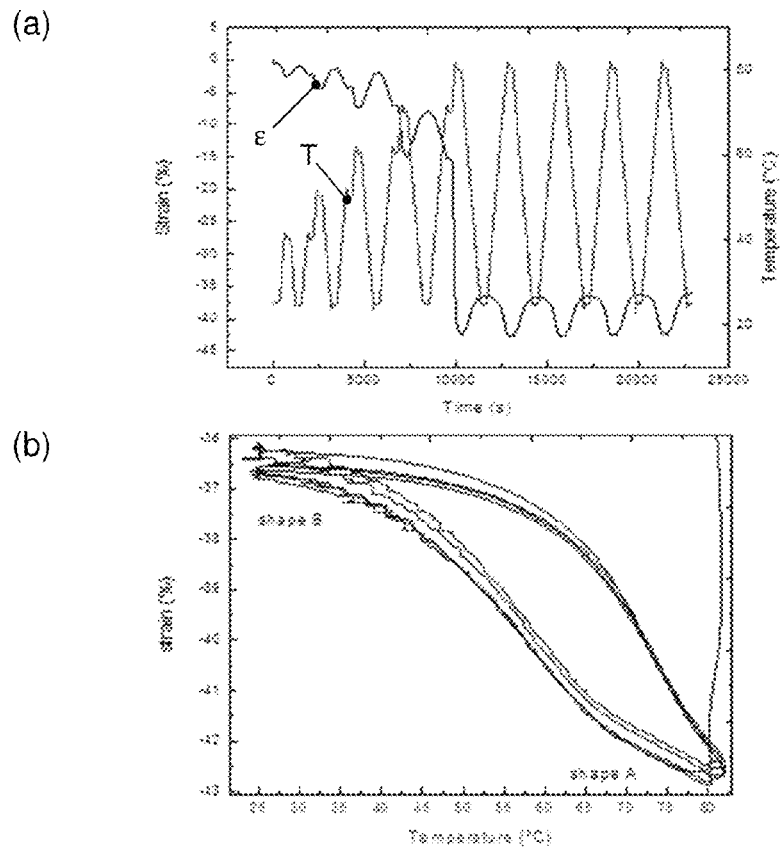

FIG. 16 Strain-temperature-time diagram (a) and strain-temperature actuation diagram (b) of cold drawn cPEVA monofilament, with $T_{low}$=25° C. and subsequently increased $T_{sep}$ from 40 to 50 to 60 to 70 to 80° C.

Figure 17:
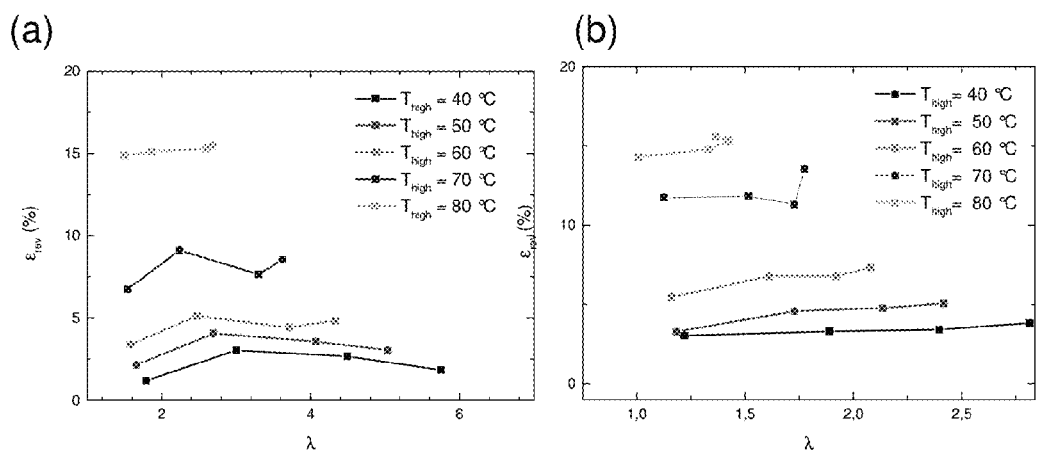

FIG. 17 Reversible strain ($ε_{rev}$) vs. extension ratio (λ) for cPEVA monofilament functionalized at $T_{prog}$=25° C. (a) and $T_{prog}$=110° C. (b) for different $T_{sep}$.

Figure 18:
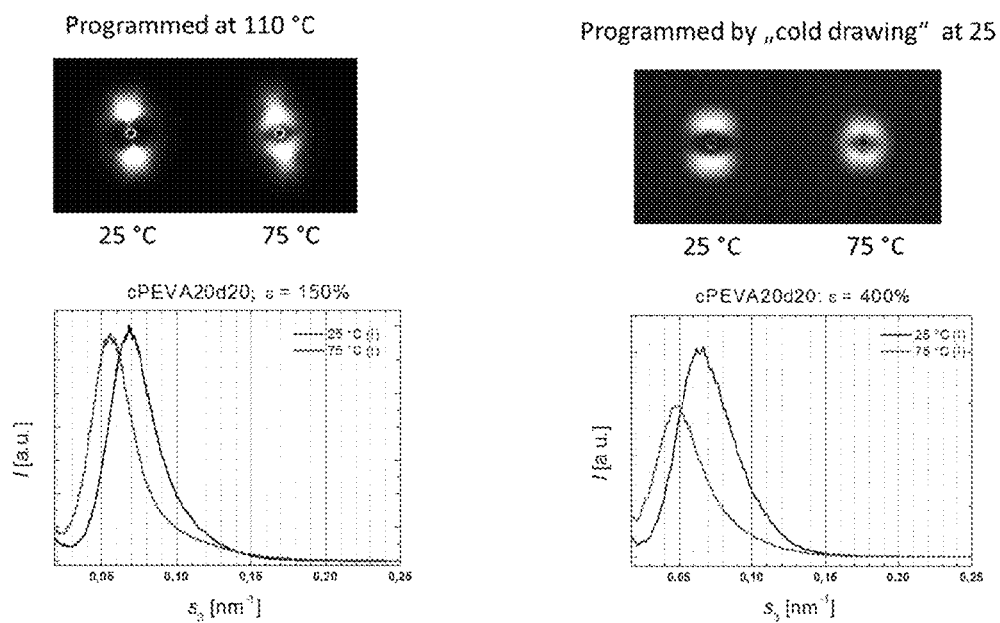

FIG. 18 SAXS scattering patterns and intensity plots of cPEVA films (cPEVA20d20) during reversible bidirectional shape-memory effect at $T_{sep}$=75° C. and $T_{low}$=25° C. of a sample programmed at $T_{prog}$=110° C. (left) and by cold drawing at $T_{prog}$=25° C. (right).

Figure 19:
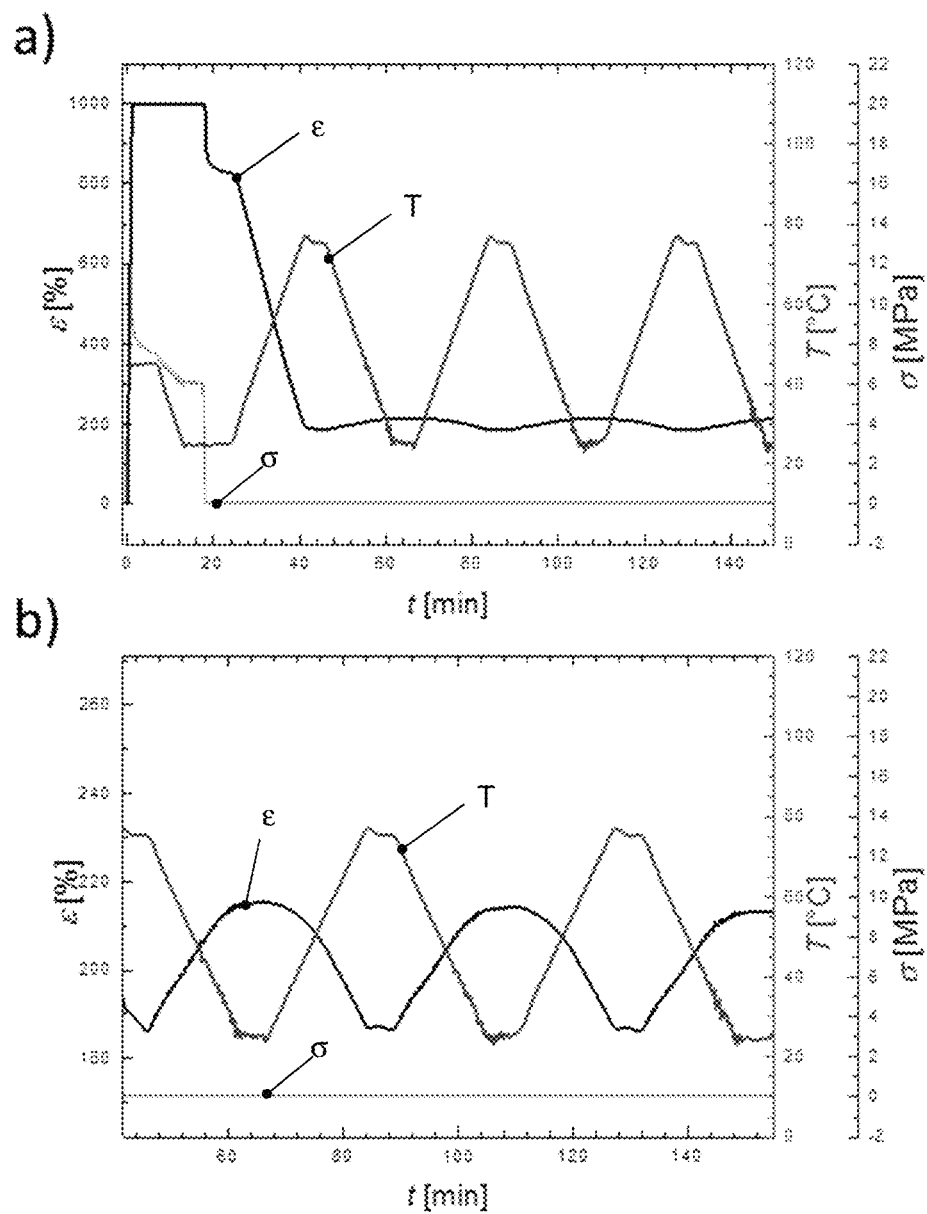

FIG. 19 Strain-temperature-time diagrams showing the programming as well as the rTME (a) of a cold drawn cPEVA film (cPEVA20d20; programmed at $ε_{ssp}$=$ε_{prog}$=1000%; $T_{prog}$=25° C.), with $T_{low}$=25° C. and $T_{sep}$ 75° C. (b): zoom in of the reversibility cycles.

Figure 20:
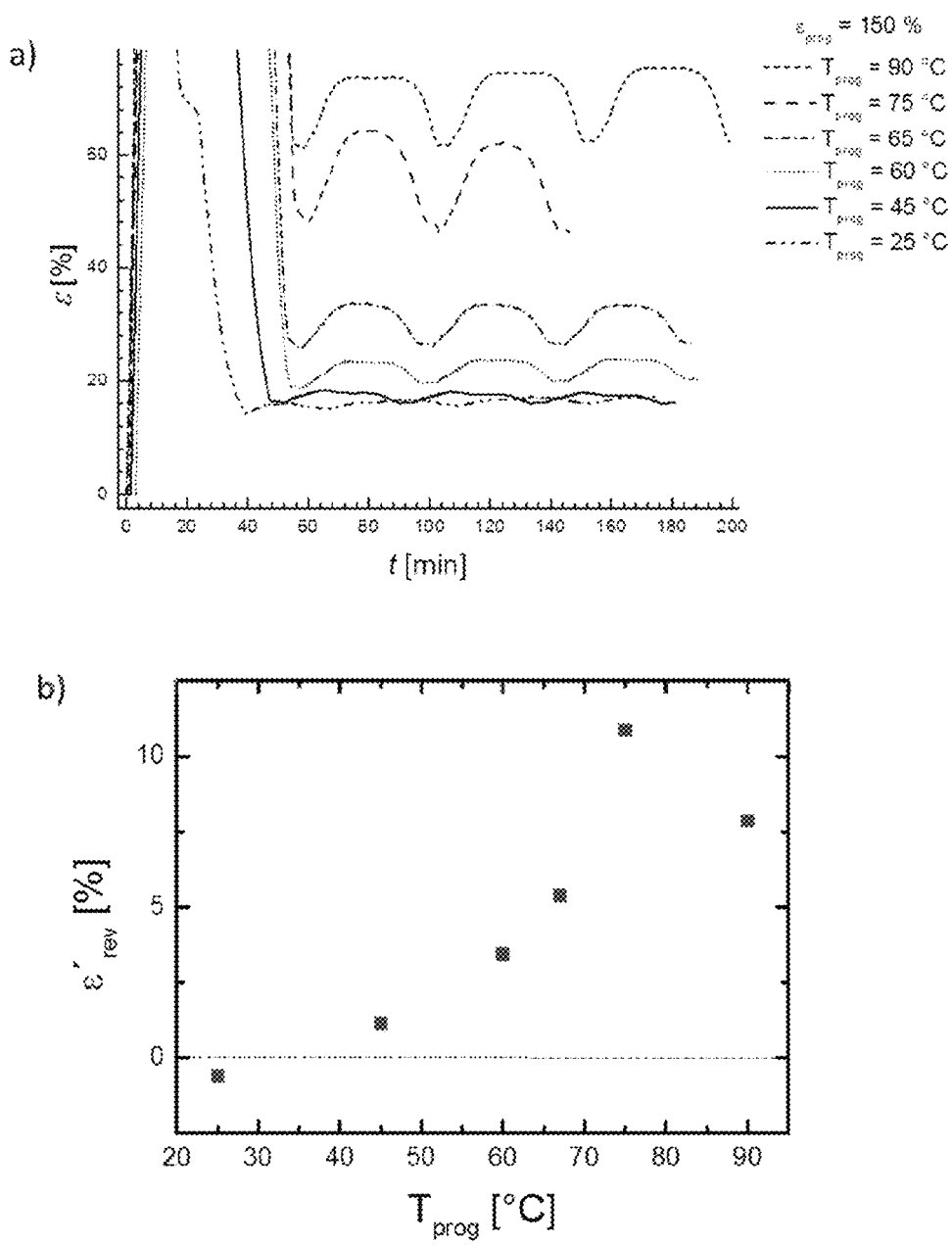

FIG. 20 Strain-temperature-time diagrams (a) showing the programming as well as the rTME of a cPEVA film (cPEVA20d20; programmed at $ε_{ssp}$=$ε_{prog}$=150% and various programming temperatures $T_{prog}$=25, 45, 60, 65, 75, 90° C.), with $T_{low}$=25° C. and $T_{sep}$ 75° C. Plot of reversible strain vs. programming temperature for cPEVA20d020 (b).

Figure 21:
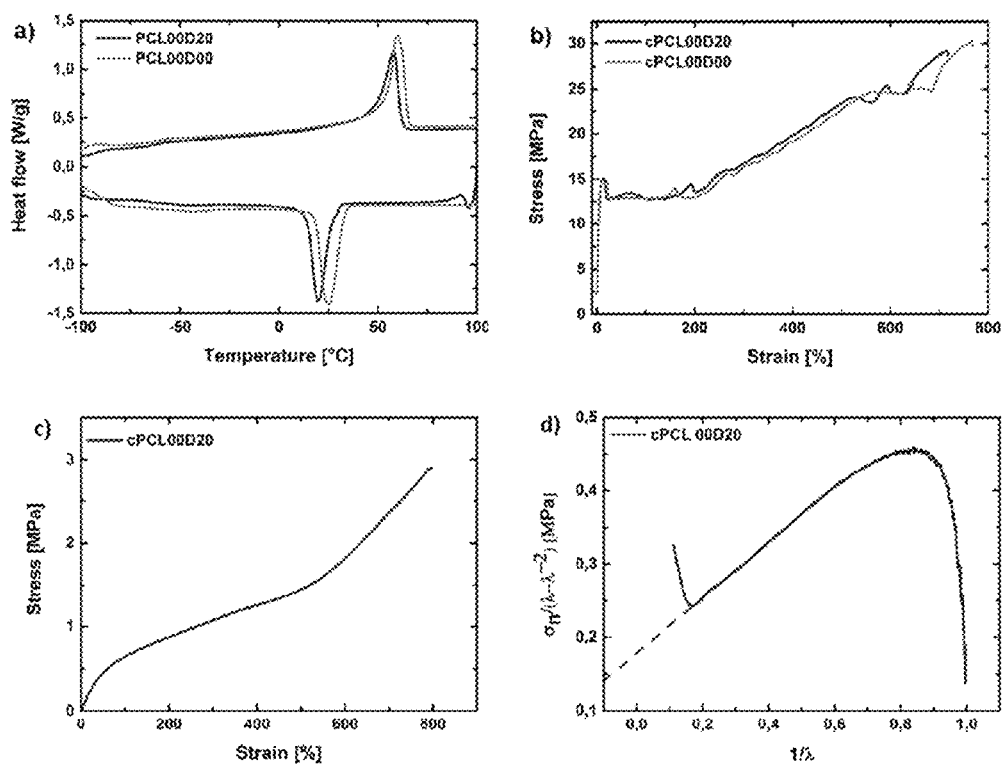

FIG. 21 Thermomechanical properties of cPCL. (a) DSC 2nd heating curves and 1st cooling curves of the pure PCL (PCL00D00) and cPCL with 2 wt % (PCL00D20) cross-linker at temperature range −100° C. to 100° C. and a heating rate of 10 K·min-1, (b) Stress-strain curves of the pure PCL and cPCL at ambient temperatures with 5 mm·min-1 strain rate, (c) Stress-strain curves of cPCL at 95° C. with 5 mm·min-1 strain rate, E is experimentally determined from the slope of stress-train curves, where the strain falls to the range of 0.02% to 0.5%, samples were cut from the films with dimensions of around 2×30 mm (width, length), (d) Mooney-Rivilin fit plot between reduced stress and reciprocal stretch ratio for cPCL, the constant C1 is determined as intercept of the curves on Y-axis (reduced stress), and C2 corresponds to the slope of the curve in Mooney fitting curve.

Figure 22:
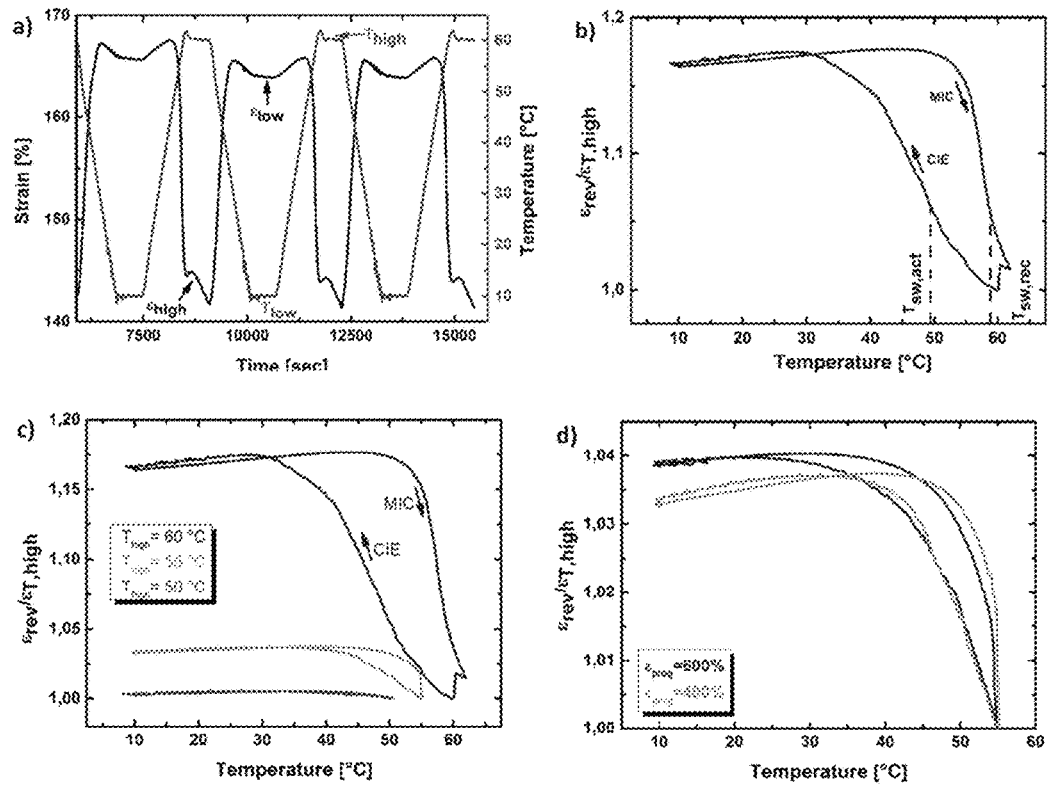

FIG. 22 Reversible actuation capability of cPCL cross-linked with 2 wt % DCP. (a) Strain-temperature-time diagrams obtained from cyclic test for quantification of rTME. These tests consisted of an initial programming step and three reversibility cycles, Parameters of experiment: $T_{prog}$=90 0, $ε_{prog}$=400%, $T_{low}$=10° C. and $T_{sep}$=$T_{high}$=60° C., pre-force was selected 30 mN. (b) Normalized reversible-strain upon heating and cooling (which was normalized by dividing by the strain value at $T_{high}$) vs. temperature during actuation ($T_{prog}$=90° C., $ε_{prog}$=400%, $T_{low}$=10° C. and $T_{sep}$=$T_{high}$=60° C.). (c) Normalized reversible-strain vs. temperature during actuation with $T_{prog}$=90° C., $ε_{prog}$=400%, $T_{low}$=10° C. and $T_{sep}$=50, 55 and 60° C. (d) Normalized reversible-strain vs. temperature during actuation with $T_{prog}$=90° C., $ε_{prog}$=400% and 600%, $T_{low}$=10° C. and $T_{sep}$=60° C.

Figure 23:
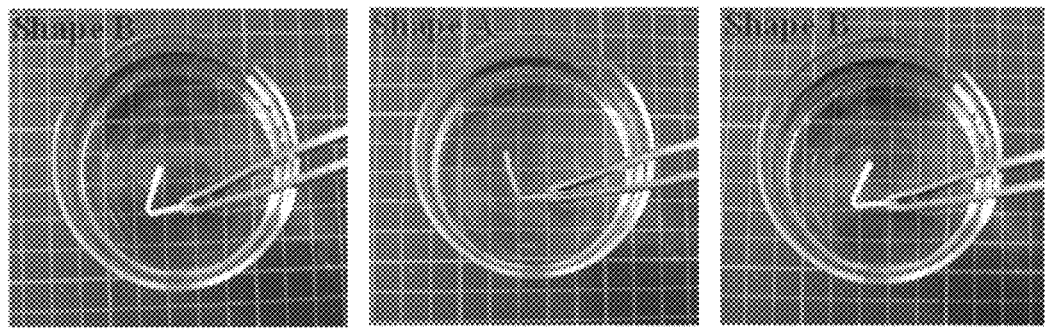

FIG. 23 Free-standing, reversible actuation capability of a stripe prepared from cPCL cross-linked with 2 wt % DCP and programmed to an angle of 180° at $T_{prog}$=90° C. The cyclic, reversible shape changes were realized by repetitively exposing the programmed sample into a water bath with $T_{high}$=50° C. and a water bath with $T_{low}$=5° C.

Figure 24:
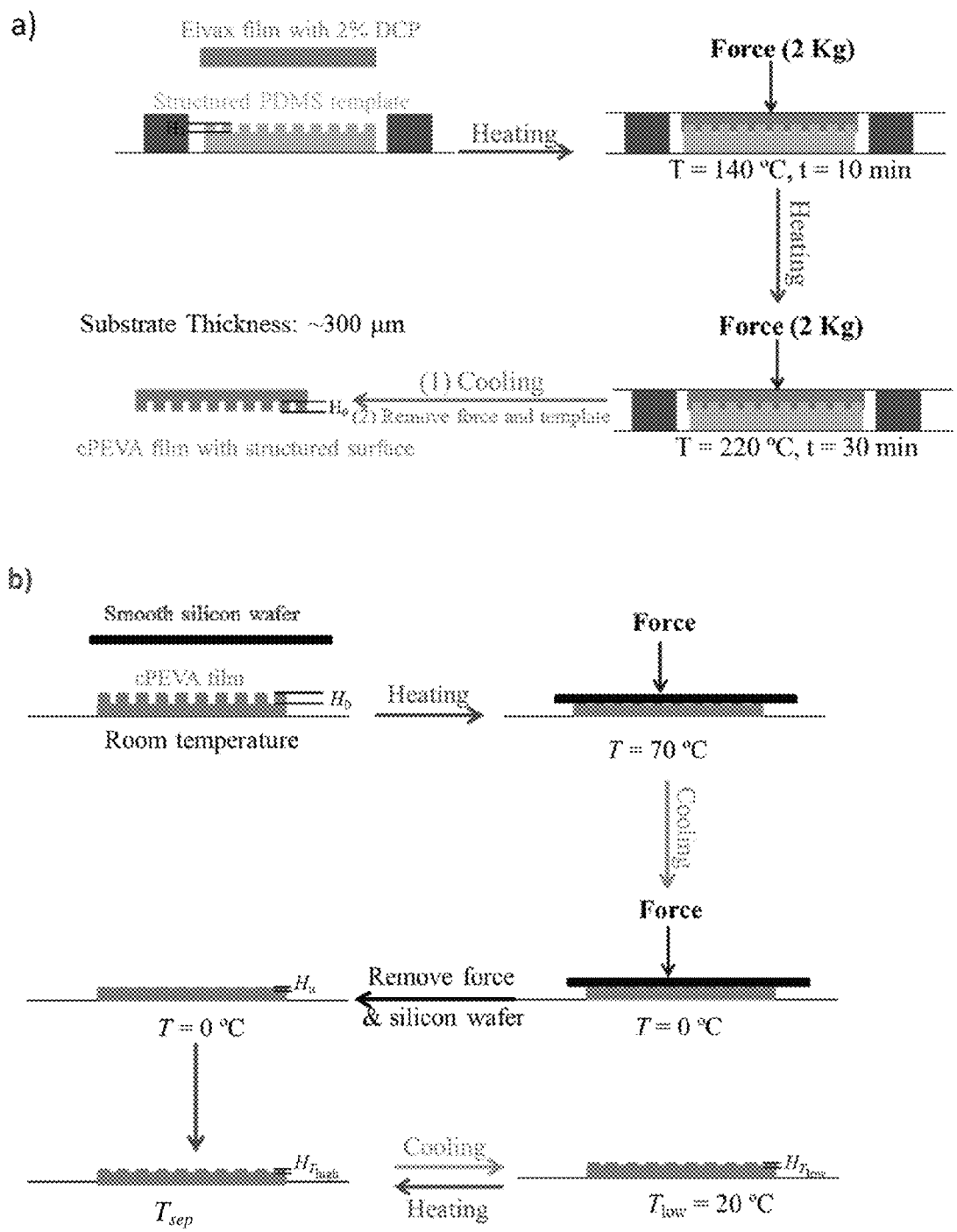

FIG. 24 Schematic representation of the preparation of microstructured cPEVA surfaces (a) and rTME quantification (b).

Figure 25:
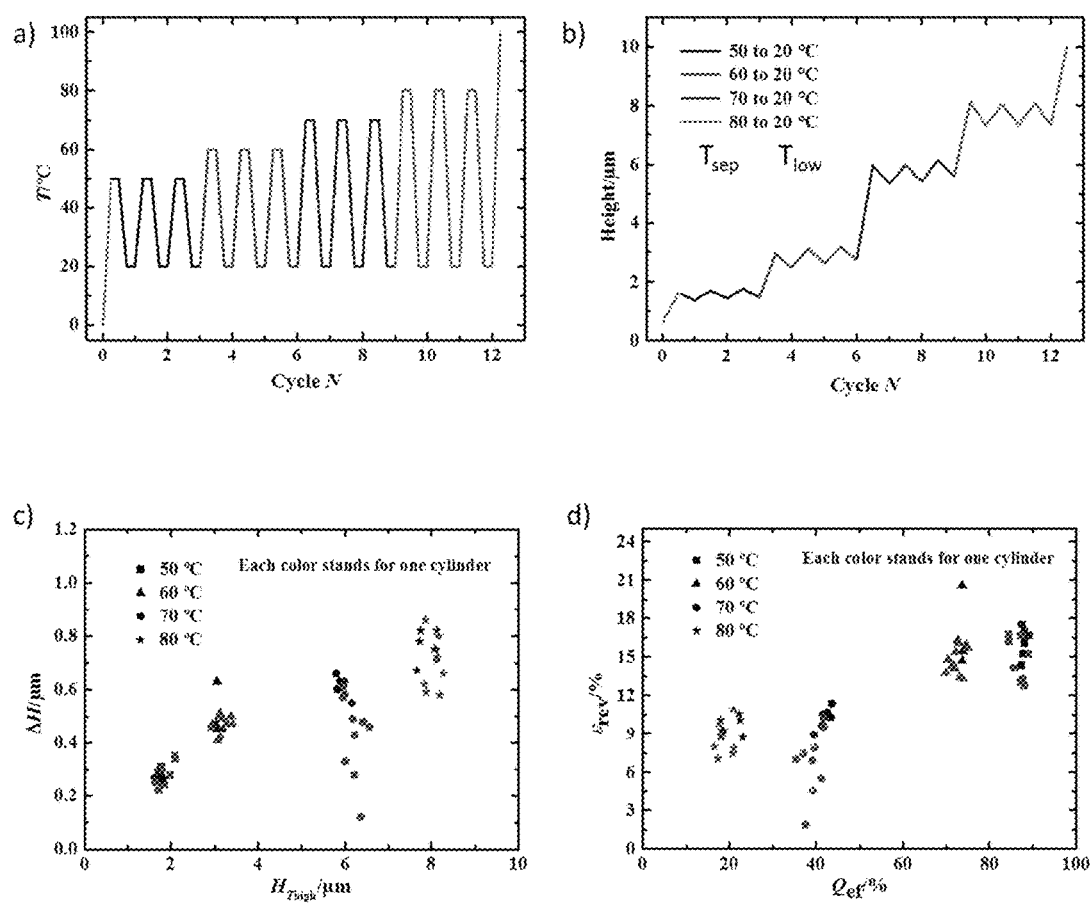

FIG. 25 Reversible actuation capability of microstructured cPEVA surfaces. (a) Temperature protocol of the rTME experiments with various separation temperatures $T_{sep}$=50° C., 60° C., 70° C., and 80° C., while the $T_{low}$ was kept at 20° C. For each separating temperature $T_{sep}$ three reversibility cycles were performed before increasing to the next higher $T_{sep}$. (b) Change in the recovered height and as the reversible height change (ΔH) of single cylindrical pillars at different $T_{sep}$. (c) Change in ΔH of various individual single cylindrical pillars at different $T_{sep}$. (d) Reversible strains $ε_{rev}$ vs. $Q_{ef}$ plot various individual single cylindrical pillars at different $T_{sep}$.

Aiming to provide a temperature-memory polymer actuator with programmable actuation temperature and (shape changing) geometry the present inventors hypothesized the requirement of a reshapeable internal skeleton to implement or adjust the alignment of nanoscaled actuation domains. This demands anchor points, which enable the orientation of the internal skeleton. The skeleton should be, on the one hand, capable of maintaining the alignment over several heating and cooling cycles and, on the other hand, sufficiently elastic to enable shape changes. The stress originating or caused by the coupled nanoscaled volume changes should be well-balanced with the entropy elastic recovery stress, which is largely influenced by the skeleton-forming domains. Therefore, a sufficiently elastic component needs to be incorporated. Lastly, actuation domains with programmable actuation temperature need to be implemented.

Based on these assumptions, a structural model for such programmable actuators was derived. It is comprised of an internal skeleton formed by crystallites, for instance, which are clustering on the nanoscale into a physical network comparable to a framework formed by brick bonds and actuation domains aligned in the frames. Upon cooling, the actuation domains expand in the direction of alignment. Hereby the frame is extended via increasing the interbrick distance. The macroscopic form stability of the skeleton after contraction of the actuation domains upon heating is given by the horizontal displacement of the bricks in the bond. The feasibility of this concept of actuators spanned in a framework of brick bonds could be recently demonstrated in a copolymer network, in which the framework and the actuator elements were provided by two chemically different polymer segments. The challenge for a temperature-memory actuator, however, is the adjustment of the actuation temperature by a physical parameter ($T_{sep}$), which should be enabled in addition to a programmable actuation geometry.

The present concept for implementing a temperature-memory in bidirectional actuators is a polymer network system, in which skeleton-forming and actuation domains are interchangeable. This is given if they are chemically identical. In such polymer networks, both domain types as well as their mechanical interplay can be adjusted by solely varying a physical parameter.

The principle of the reversible bidirectional shape- and temperature memory polymer rTMP according to the present invention is schematically shown in FIG. 1, where the programming procedure resulting in shape A is depicted on the left side and the reversible switching between two programmed shapes A and B triggered by the bidirectional shape-memory effect bSME on the right side.

The programming procedure comprises (a) providing an actuator consisting of or comprising a covalently or physically cross-linked polymer network. The initial polymer network is shown at the left side of FIG. 1. The polymer comprises a first phase having a broad thermodynamic phase transition extending in a temperature range from $T_{trans,onset}$ to $T_{trans,offset}$, and an elastic phase having a glass transition temperature $T_g$, with $T_g < T_{trans,onset}$. The polymer has an initial shape, for example a flat sheet as shown here. The covalent or physical net points are represented in FIG. 1 by dots.

The programming further comprises (b) deforming the polymer to a desired shape by applying a stress at a temperature $T_{prog}$. In the shown non-limiting example, the programming temperature $T_{prog}$ is above $T_{trans,offset}$ so that the polymer is in a rubbery-elastic state, i.e. it does not contain any crystal or glassy domains. The deformation is adapted to align chain segments of the polymer along a common direction. In the shown non-limiting example the deformation is an elongation of the sheet.

The programming further comprises (c) setting the polymer to a temperature $T_{low}$ with $T_{low} \leq T_{trans,onset}$ under maintaining the stress as to provide a solidified state of the polymer domains associated with the first phase. When $T_{prog}$ is above $T_{trans,offset}$, the polymer is cooled to $T_{low}$ (not shown).

The programming further comprises (d) releasing the stress and heating the polymer to a predetermined separation temperature $T_{sep}$, with $T_{trans,onset} < T_{sep} < T_{trans,offset}$, under stress-free conditions. At $T_{sep}$ first polymeric domains AD of the first phase having a transition temperature in the range between $T_{trans,onset}$ and $T_{sep}$ melt. At the same time, second domains SD of the first phase having a transition temperature in the range between $T_{sep}$ and $T_{trans,offset}$ maintain in the solidified state, i.e. a crystalline or glassy state. In this way, shape A is implemented. As melting of AD involves contraction of the aligned polymer segments, heating to $T_{sep}$ causes the polymer to contract, so that shape A has a smaller extension/length compared to the elongation (deformation) applied at $T_{prog}$. Shape A geometrically lies between the initial shape of the unprocessed polymer (FIG. 1, leftmost side) and the deformation shape applied by the stress (FIG. 1, second from left). After heating to $T_{sep}$ not only shape A but also the bidirectional shape- and temperature-memory effect is implemented in the material.

The reversibility module of the present invention shown on the right part of FIG. 1 comprises (e) cooling the polymer to a temperature $T_{low}$, with $T_{low} \leq T_{trans,onset}$ under stress-free conditions. Cooling below $T_{trans,onset}$ causes the first domains AD to solidify, i.e. to crystallize or to vitrify. Solidification of AD causes a shape-shift from shape A to shape B (FIG. 1, rightmost side). Shape B corresponds to a shape that geometrically lies between the shape of deformation applied in the programming cycle at $T_{prog}$ in step (b) and shape A.

The reversibility module further comprises (f) increasing a material temperature of the polymer to temperature $T_{sep}$ with $T_{trans,onset} < T_{sep} < T_{trans,offset}$ under stress-free conditions thus causing a shape-shift from shape B to shape A. It should be noted that $T_{sep}$ as applied in the reversibility module may differ from the separation temperature $T_{sep}$ applied in step (d) of the programming module.

Without being bound to theory, it is assumed that the second domains SD, that have a transition temperature in the range between $T_{sep}$ and $T_{trans,offset}$ and are thus in a crystalline or glassy state at $T_{sep}$, form a skeleton which is at least partially embedded in the first domains AD which are in a molten state at $T_{sep}$ as shown in FIG. 1 at shape A. The skeleton-forming domains SD ensure stabilization of shape A and are maintained in their solidified state during reversible switching between shapes A and B as long the temperature does not exceed $T_{sep}$. The second domains are therefore also referred to as skeleton domains SD. At $T_{sep}$ the first domains AD, on the other hand, are molten and in a rubbery-elastic state. Upon cooling to $T_{low}$ the domains AD solidify by crystallization or vitrification thereby giving rise to an increase in volume and/or length resulting in a macroscopic shape-shift from shape B to shape A. Thus, the first domains AD are also referred to as actuating domains AD.

At $T_{low}$, the skeleton-forming domains SD and the actuating domains AD are believed to be present in a nanoscaled brick-like structure and arranged in an aligned or orientated fashion according to the direction of elongation during deformation. When heated to $T_{sep}$ the actuating domains AD melt under a decrease of volume leading to a macroscopic decrease of the length of the polymer network. Upon cooling to $T_{low}$ the actuating domains AD solidify which is accompanied by an increase in volume. This leads to an increase in the gaps between the bricks of the skeleton domains SD and to an increase in the macroscopic length, visible as a change in shape from A to B. This heating and cooling cycle between $T_{low}$ and $T_{sep}$ is called reversibility cycle and can be repeated many times.

The shape-changing geometry can be re-programmed leading to new shapes A' and B' as shown in FIG. 2.

As shown in FIG. 2, reheating to $T_{prog}$, i.e. bringing the polymer in a visco-elastic state, allows a new programming process of a new bodies' appearance. For instance, bending the polymer sheet along its length extension and subsequent cooling under stress results in bended shape A. Reheating to $T_{prog}$ melts the skeleton domains SD and erases the programmed shape A. Bending the bSMP sheet along its width extension at $T_{prog}$ and subsequent cooling under stress gives rise to a new bridge appearance, shape A' (FIG. 2a, right). In each case, the bodies' overall appearance is determined by the solidified (crystallized or vitrified) skeleton domains SD. Covalent (i.e. chemical) or non-covalent (physical) netpoints shown as dots connecting the chain segments enable orientation of the chain segments in the visco-elastic state at $T_{prog}$.

Furthermore, once the polymer body has been programmed, variation of the temperature between $T_{low}$ and $T_{sep}$ (with $T_{low} < T_{trans,onset} < T_{sep} < T_{trans,offset}$) reversibly switches the polymer body between the two shapes A and B or A' and B', respectively, which are determined by the programming process (FIG. 2b). This bidirectional shape-memory effect is driven by the solidification and melting of the oriented actuator domains AD.

EXAMPLES

Methods

Preparation of Covalently Cross-Linked Polymer Networks:

The following protocol was used for all materials unless otherwise indicated. As cross-linking agent dimucyl peroxide (DCP) was used. DCP decomposes when heated to form alkoxide radicals that, in turn, abstract hydrogen from the polymer back-bone, forming polymer radicals. A combination of two polymer radicals results in a crosslink. Initially 100 g of polymer was mixed with 2 wt % DCP in twin screw extruder Prism Lab, 16 mm (Thermo Scientific, USA). At first, DCP was dissolved in ethanol and was then mixed with the polymer granules properly, while extrusion was carried out at 150° C. with a screw rotating speed of 50 rpm. These parameters were varied accordingly, with the type of polymer used. These extruded compositions were cut into small pellets on a cutter and were extruded again with same conditions to get homogeneous mixing of the polymer and DCP blends. In case of blends, same procedure was adopted. Different formulations were prepared, some with pure single polymers as PEMAGMA, PEAEMA, PEVA, PCL and others. Also, blends of these polymers were prepared with PCL with 74/24, 49/49 and 24/74 proportion of both polymers. In single polymer networks, DCP concentration was varied as 2%, 1.5% and 1%, in order to study the effect of the concentration of crosslinker on crosslink density and consequently on the shape memory properties. While in case of blends the DCP concentration was kept constant as 2%, only the polymers ratio for blending was changed.

Preparation of Covalently Cross-Linked Network Films:

Covalently cross-linked polymer networks were synthesized by thermal induced free radical cross-linking reaction with DCP as thermal initiator, with the compositions formulated by extrusion. For this purpose, the granulates of polymer/DCP blends were compression molded into films of around 1 mm thickness on a compression molding machine (type 200 E, Dr. Collin, Ebersberg, Germany). After a waiting time period of 5 min at 110° C. (for melting), the cross-linking reaction occurred by increasing the temperature to 200° C. while maintaining a pressure of 90 bar for 25 min. In case of PCL/DCP and its blends with other polymers, the pressure applied was even higher, around 120 bar.

Programming and Actuation Cycles:

Quantification of the temperature-memory actuation capability was conducted by cyclic, thermo-mechanical tensile tests with a standardized sample shape (ISO 527-2/1BB) on a Zwick Z1.0 machine equipped with a thermo-chamber and a 200 N load cell. The experiment consisted of an initial skeleton formation module (called programming) and subsequent reversible actuation cycles. In the programming module, the sample was stretched with a rate of 5 mm·min$^{-1}$ to $\epsilon_{ssp}$ at $T_{prog}$ and equilibrated for 5 min. After cooling to $T_{low}$ under constant strain and 10 min equilibration time the sample was reheated to $T_{sep}$ under stress-free conditions, resulting in shape A. The reversible actuation cycle consisted of cooling to $T_{low}$, waiting for 10 min and reheating to $T_{sep}$ followed by another waiting period of 10 min. Heating and cooling rates were 1 K·min$^{-1}$, in long-term experiment 5 K·min$^{-1}$. In experiments in which $T_{sep}$ was varied the programming module and an actuation cycle starting with the lowest $T_{sep}$ were conducted. Afterwards $T_{sep}$ was raised and after a waiting period of 5 min a subsequent actuation cycle was carried out.

rTME Bending Experiments:

Programming of the cPCL test specimen was realized by bending the initially straight sample to 180° in the complete amorphous state using water bath with $T_{prog}$=90° C. Subsequently, the deformed sample was brought into water bath having a temperature of 5° C. for fixation of the hairpin like shape. The cyclic, reversible shape changes were realized by repetitively exposing the programmed sample into a water bath with $T_{high}$=50° C. and a water bath with $T_{low}$=5° C., The reversible shape changes were recorded with a camera by single photographs for each cycle. The quantification of the rbSME in bending experiments was based on the reversible change in the bending angle $\Delta\theta$ calculated according to following equation:

$$\Delta\theta=\theta(T_{high})-\theta(T_{low})$$

Where $\theta(T_{high})$ is the angle obtained at 50° C. and $\theta(T_{low})$ the angle observed at 5° C.

Preparation of cPEVA Films with Micro Structured Surface:

Elvax 460 was purchased from Dupont, consisting 18% vinyl acetate comonomer content. First a film containing 98 wt % Elvax 460 and 2 wt % dicumyl peroxide (DCP) was prepared by solvent casting. 6 g Elvax 460 and 1.2 g dicumyl peroxide were dissolved in 50 ml toluene at 80° C. The obtained solution was poured into Petri dish to perform the solution casting. The Elvax film was obtained after the solvent fully evaporated. A schematic representation of the preparation of microstructured cPEVA surfaces is shown in FIG. 24a. The Elvax/DCP film was placed against the microstructured surface of PDMS mold (array of cylindrical holes with 10 μm height (H) and 10 μm diameter (D) under a force of 2 kg at 140° C. for 10 min. Then, the temperature was increased to 220° C. and kept for 30 min to ensure the full crosslinking of the film. Finally, the temperature was cooled down to room temperature. The obtained cPEVA film was peeled from PDMS mold. The microstructured cPEVA sample was programmed by vertical compression at 70° C. and fixed at 0° C. The separation temperature $T_{sep}$ was set as 50° C., 60° C., 70° C., and 80° C., while the low temperature $T_{low}$ was set as 10° C. (see FIG. 24 b). For each separating temperature $T_{sep}$ three reversibility cycles were performed before increasing to the next higher separating temperature. The changes in height of the single cylindrical pillars at different temperatures were explored by AFM experiments with AC mode.

Differential Scanning Calorimetry (DSC):

The thermal behavior of pure polymers and their blends was studied by differential scanning calorimetry. DSC measurements were performed on a calorimeter (DSC 204, Netzsch, Selb, Germany). Heating range selected was from −100° C. to 100° C. with heating rate of 20 K·min$^{-1}$. At first, samples were cooled to −100° C. from room temperature and then the measurement was started (heating-cooling-heating cycle). First heating was performed to remove the thermal history of the samples. After melting, the same sample was cooled down under nitrogen flux and re-heated to evaluate changes in the structure. Then the second heating run was performed at the same heating rate. The values of melting and glass transition temperatures were taken from this second heating curve and the crystallization temperature was determined from cooling curve.

WAXS Measurements:

WAXS measurements were performed using an X-ray diffraction system Bruker D8 Discover with a two-dimensional Hi-Star detector (105 μm pixel size) from Bruker AXS (Karlsruhe, Germany). The X-ray generator was operated at a voltage of 40 kV and a current of 40 mA on a copper anode. A graphite monochromator produced Cu—K$_\alpha$ radiation (0.154 nm wavelength) and a 3 pinhole collimator with an opening of 0.8 mm was used. The distance between sample and detector was 150 mm, calibrated with Corundum standard. In-situ measurements at fixed stages during TMCP were performed using a custom-build stretching device, a heating gun, and a cooled nitrogen gas stream at 5 min exposure time per scattering pattern.

SAXS Measurements:

Small-angle X-ray scattering (SAXS) was performed on a Bruker AXS Nanostar diffractometer employing a two dimensional VANTEC-2000 detector. The distance sample to detector was 1070 mm, the beamsize 400 µm and the wavelength 0.154 nm. The 2D-scattering patterns were integrated after background subtraction over a 10° wide chi range along the $s_3$ axis (deformation direction), where discrete peaks were observed, leading into a one-dimensional curve I vs $s_3$. Longperiods were determined from the position of the peak maxima after Lorentz correction ($I(s) \rightarrow s^2 I(s)$) as $L=1/s_L$ and were provided as the average from the measurements in the reversibility cycles with $T_{sep}$ and $T_{low}$. 2D-patterns were processed as follows: After background subtraction and correction for exposure time and sample absorption, invalid pixels (e.g. beamstop) were masked. Patterns were rotated to match their fibre axis in vertical direction. The fibre symmetric patterns were harmonized (4 quadrant symmetry) and the central spot was filled. Patterns are presented in the region of interest (~0.4 nm$^{-1}$) in pseudo-colors. Furthermore the chord distribution function (CDF) was calculated in order to extract structural information. Here the patterns were projected on the fibre plane ($s_{1,2}$ $s_3$) and the interference function was calculated. By Fourier transformation the CDF was obtained, representing the nanostructure in real space (r1,2 r3), as well as domains sizes and distances.

Atomic Force Microscopy (AFM) Experiments:

For quantification of rTME of microstructured cPEVA surface structures were performed on a MFP-3D AFM (Asylum Research) in the AC mode. The temperature was controlled by an Environmental Controller (Asylum Research) with a Peltier element. The heating and cooling rate is 10° C./min, and the samples were kept 10 min at each temperature before scanning. For height images scanned with AC mode, the silicon cantilever (Olympus OMCL AC200TS-R3), having a typical driving frequency of around 150 KHz, were used. The tip has the radius of 7 nm. The tip back and side angles are 35° and 18°, respectively. Typical scan rate was 0.3 Hz. For indentation experiment with contact mode, the silicon cantilever (Olympus OMCL AC160TS-R3), having a typical driving frequency of around 300 KHz, were used. The tip has the radius of around 9 nm. The tip back and side angles are 35° and 15°, respectively. The scan rate is 0.2 Hz and force distance is 5 µm. The rTME was quantified by determining the deformation fixation efficiency $Q_{ef}$ as the ratio between the compression of sample in shape A ($\epsilon_A$) at the separating temperature $T_{sep}$ and the programmed compression or bending ($\epsilon_{prog}$) $Q_{ef}=\epsilon_A/\epsilon_{prog}$ as well as the reversible compression or bending $\epsilon'_{rev}$ from the ratio between the difference in sample height of shape B at low temperature $T_{low}$ and shape A at separating temperature and the height or angle in shape A $\epsilon'_{rev}=(H_A-H_B)/H_A$ or $\epsilon'_{rev}=(\theta_A-\theta_B)/\theta_A$.

Polymers

Covalently Cross-Linked Poly[Ethylene-Co-(Vinyl Acetate)](cPEVA)

Covalently cross-linked poly[ethylene-co-(vinyl acetate)] (cPEVA) was used as material basis in this example, comprising crystallizable polyethylene PE segments ($T_{trans}=T_m$). The repeating units of vinyl acetate VA contribute to a broad melting transition of PE crystallites. In addition, the related amorphous phase contributes to the elastic deformability of the skeleton. The covalent cross-links provide form stability at $T_{prog}$ for elongation to $\epsilon_{ssp}$ during programming and in this way allow the orientation of both actuator and skeleton-forming PE domains.

cPEVAs having varying monomer ratios were prepared by mixing (100-x) g poly[ethylene-co-(vinyl acetate)] with a vinyl acetate content of 10 wt % (Greenflex ML30, Polimeri Europa, cPEVA10), of 20 wt % (Elvax460, DuPont, cPEVA20), of 31 wt % (EVAX3175, DuPont, cPEVA31) or of 35 wt % (EVAX150, DuPont, cPEVA35) and x g (x=0; 0.5; 1.0; 2.0, 5.0) dicumyl peroxide (Sigma-Aldrich) in a twin-screw extruder (EuroPrismLab, Thermo Fisher Scientific) at 110° C. and 50 rpm. The blends were compression molded into films with 1 mm thickness and subsequently crosslinked at 200° C. and 20 bar for 25 min.

Covalently Cross-Linked Poly Ethylene (cPE) (Comparative Experiment)

Cross-linked polyethylene cPEd20 was prepared by mixing 98 g low density polyethylene (Lupolen 1800 H, Lyondel) and 2 g dicumyl peroxide, other conditions were the same as described for cPEVA.

Covalently Cross-Linked Block-Copolymer (cPCLBA)

cPCLBA is a covalent block copolymer network of poly(ε-caprolactone) and poly(butyl acrylate). It was synthesized by thermally induced copolymerization of poly(ε-caprolactone)diisocyantoethyl dimethacrylate (38.8 wt %) with 60.4 wt % n-butyl acrylate (Sigma-Aldrich) and 0.8 wt % 2,2'-azoisobutyronitrile at 80° C. for 72 hours. Poly(ε-caprolactone)diisocyantoethyl dimethacrylate was obtained from the reaction of poly(ε-caprolactone) ($M_n$ 8,300 g·mol$^{-1}$) with 2-isocyantoethyl methacrylate according to the procedure described in (Kumar U N, Kratz K, Wagermaier W, Behl M, Lendlein A (2010). *J. Mater. Chem.* 20(17):3404-3415). cPCLBA provided a $T_{g,mix}$ at -63° C. and a $\Delta T_m$, which ranged from 5 to 60° C. with the peak at 50° C.

Covalently Cross-Linked Block-Copolymer (cPCLP-CHMA)

cPCLCHMA is a covalent block copolymer network of 85 wt % segments of poly(ε-caprolactone) and 15 wt % segments of poly(cyclohexyl methacrylate) (PCL(85)PCHMA (15)). It was synthesized by copolymerization poly(ε-caprolactone)diisocyantoethyl dimethacrylate and cyclohexyl methacrylate as described for cPCLBA.

Covalently cross-linked Poly[ethylene-co-(acrylic ester)-co-(maleic anhydride)](cPEAEMA)

Poly[ethylene-co-(acrylic ester)-co-(maleic anhydride)] (PEAEMA) (Lotader® 5500) is a random terpolymer comprising 77.2 wt % ethylene, 20 wt % acrylic ester and 2.8 wt % of maleic anhydride. As a copolymer of ethylene, it is compatible with other ethylene copolymers, while acrylic ester provides softness and polarity and high thermal stability during processing and melting temperature is around 80° C. and density is given as 0.941 g·cm$^{-3}$. Reactive group in PEAEMA is maleic anhydride which leads versatile adhesive properties to polar and non-polar substrates and to molten polymers. PEAEMA was cross-linked using 2 wt % dicumyl peroxide (DCP).

Covalently Cross-Linked Poly[Ethylene-Co-(Methyl Acrylate)-Co-(Glycidyl Methacrylate)](cPEMAGMA)

Poly[ethylene-co-(methyl acrylate)-co-(glycidyl methacrylate)](PEMAGMA) (Lotader@AX8900) is a random terpolymer with around 68 wt % PE, whereas methyl acrylate content is 24 wt %. Here the reactive group is glycidyl methacrylate (GMA) which is 8 wt %. Melting temperature for Lotader@AX8900 is around 65° C. while density is similar to that of Lotader® 5500. PEMAGMA was cross-linked using 2 wt % dicumyl peroxide (DCP).
Covalently Cross-Linked Blend of Poly[Ethylene-Co-Octene] and HDPE (cPEbEOC)

Poly[ethylene-co-octene](cPEOC) is a random copolymer of ethylene and octene. A blend of 85 wt % of high density polyethylene (HDPE) and 15 wt % of cPEOC was cross-linked using 1 wt % or 2 wt % dicumyl peroxide (cHPEbEOC15d10, cHPEbEOC15d20).
Covalently Cross-Linked Poly(ε-Caprolactone) (cPCL)

Poly(ε-caprolactone) (PCL) with a number average molecular weight of 41000 g·mol$^{-1}$ and a polydispersity of 1.73 (as determined by gel permeation chromatography using chloroform as eluent) was purchased from Perstorp Holding AB (trade name CAPA® 6800, Perstorp, Sweden) and dicumyl peroxide (DCP) with a purity of 98% was received from Sigma-Aldrich (Saint Louis, Mo., USA) while ethanol (96%) was obtained from Berkel AHK (Berlin, Germany). cPCL was prepared in a two-step procedure. Initially 98 g of PCL polymer granules were properly coated with 2 g DCP dissolved in ethanol. After drying, the DCP-coated PCL was mixed in a twin-screw extruder model Euro Prism Lab 16 mm (Thermo Fisher Scientific Inc., Waltham, Mass., USA) at 110° C. and a rotation speed of 50 rpm. In the second step the prepared PCL-DCP blends were compression molded into 2D films with a thickness of 1 mm via a compression molding machine (type 200 E, Dr. Collin, Ebersberg, Germany) at 110° C. and subsequently cross-linked at 200° C. and 120 bar for 25 min.
Results
1. Covalently Cross-Linked Poly[Ethylene-Co-(Vinyl Acetate)](cPEVA)

FIG. 3b, upper plot shows a DSC diagram of cPEVA20d20 which has a broad melting transition ranging from about 25° C. ($T_{m,onset}$) to about around 90° C. ($T_{m,offset}$). The $T_{sep}$ divides crystallizable PE domains in geometry determining and actuation domains. A temperature memory was observed for this polymer when the separation temperature $T_{sep}$ was selected within a range from 40 to 80° C. A respective normalized integral of first DSC heating curve for cPEVA20d20 as a measure for the crystallinity at $T_{sep}$ is shown in FIG. 8.

In the programming cycle, the amorphous cPEVA samples were deformed at $T_{prog}$=90° C. at an elongation of $\varepsilon_{ssp}$=150%, cooled to $T_{low}$=25° C. under maintenance of the stress and heating to $T_{sep}$=75° C. FIG. 3a shows schematically the molecular structure of cPEVA at the different temperatures during this programming cycle. At $T_{prog}$ the polymer is in a rubbery-elastic state, where the polymer chains are interconnected by covalent cross-links symbolized by dots ● (FIG. 3a, right). After cooling to $T_{low}$ under stress, all PE domains are crystallized (FIG. 3a, left). At $T_{sep}$ appearance is determined by the directed crystallization of the internal skeleton-forming domains SD, whereas the actuation domains AD are molten (FIG. 3a, middle). Reversible shape changes are realized in the polymer by crystallization/melting of oriented polyethylene segments in the actuation domains AD between $T_{low}$ and $T_{sep}$.

Heating the cPEVA actuator to $T_{sep}$ and cooling it to $T_{low}$ under stress-free conditions causes the actuator to reversibly shift its shape between shape B and shape A. The DSC thermogram of representative actuation cycle of cPEVA (cPEVA20d20 with 20 wt % VA cross-linked with 2 wt % dimucyl peroxide) is shown in FIG. 3b, middle. Upon heating to $T_{sep}$, a melting peak with a peak maximum, which is significantly lower compared to the peak maximum obtained when the sample was completely molten (cf. FIG. 3b, upper plot) can be observed. In the cPEVA20d20 sample around one-third of the PE crystallinity is located in the skeleton-forming domains SD and two-third are acting as actuating domains AD as determined from DSC, which seemed to be an optimal balance for this material.

FIG. 3b, bottom shows the elongation ε as function of temperature T during the first reversible actuation cycle. Shape A as obtained by the programming cycle has an elongation $\varepsilon_A$ of 61.3% at $T_{sep}$. Cooling to $T_{low}$ results in shape B corresponding to $\varepsilon_B$ of about 73.5%. Heating to $T_{sep}$ recovers $\varepsilon_A$ again.

The actuation between shape A ($\varepsilon_A$=61.3%) and shape B ($\varepsilon_B$=73.5%) is characterized by the actuation temperatures $T_{act}$(A→B)=59±1° C. and $T_{act}$(B→A)=69±1° C. The two $T_{act}$ correspond to the crystallization ($T_c$=55±3° C.) and melting ($T_m$=68±3° C.) temperatures obtained during cooling and heating between $T_{sep}$=75° C. and $T_{low}$=25° C.

A ribbon of cPEVA (80 mm×20 mm×0.9 mm; cPEVA20d20) was folded at $T_{prog}$=90° C. in a concertina shape, cooled to $T_{low}$=25° C., and heating to $T_{sep}$, which was varied. The polymer was inked at its edges with blue color to enhance contrast. Upon cooling to $T_{low}$=25° C. and heating to the different $T_{sep}$ the concertina shifted reversibly between a contracted concertina (shape B) and an expanded concertina (shape A) as shown in FIG. 4. Here, the degree of actuation as well as $T_{act}$ of the programmed ribbon could be systematically adjusted by solely varying $T_{sep}$.

The temperature-memory actuation capability of cPEVA was studied by variation of $T_{sep}$ within $\Delta T_m$ using compositions comprising 10 and 20 wt % vinyl acetate (cPEVA10d20 and cPEVA20d20). Programming parameters were $T_{prog}$=90° C. and $T_{low}$=25° C. The influence of the VA content on the relative reversible elongation $\varepsilon'_{rev}$ as function of time is shown in FIG. 5a (Top: cPEVA10d20, Bottom: cPEVA20d20). A higher VA content broadens the range in which $T_{sep}$ can be varied. A pronounced bidirectional TME could be observed for $T_{sep}$ between 60 and 90° C. for cPEVA10d20 as well as between 40 and 80° C. for cPEVA20d20. The relative reversible elongation $\varepsilon'_{rev}$ quantifies the extent of the shape change occurring during the reversibility cycle and is defined as the ratio between the difference in elongation of shape B and the elongation at shape A compared to the elongation at shape A. In these experiments, an $\varepsilon'_{rev}$ of up to 8% could be achieved depending on $T_{sep}$. In contrast, both materials showed classical thermal expansion upon heating and contraction upon cooling at higher $T_{sep}$, where no suitable skeleton domains are present, or at lower $T_{sep}$, at which the actuation is prevented by the relatively high crystallinity of skeleton forming domains. An additional, however less important, oppositely directed contribution to $\varepsilon'_{rev}$ attributed to thermal expansion of the copolymer network was observed with increasing $T_{sep}$ at $T_{sep}$≥80° C.

The correlation between the applied $T_{sep}$ and the resulting $T_{act}$ was almost linear for both material compositions as shown in FIG. 5b, which clearly demonstrates the excellent temperature-memory capability of both polymer networks. $T_{act}$ could be systematically adjusted for cPEVA20d20 from 36±1° C. to 76±1° C. and for cPEVA10d20 from 55±1° C. to 87±1° C. by variation of $T_{sep}$.

FIG. 5c shows the elongation versus the cycle number of cPEVA20d20 in a long term study over 260 actuation cycles under stress-free conditions applying $T_{sep}$=75° C. In the first 120 cycles the actuation was measured after the material was deformed by elongation with $\varepsilon_{ssp}$=100% and in further 130 cycles with $\varepsilon_{ssp}$=150%. The middle plot shows the complete series of bidirectional actuation, while the insets show magnifications after different cycle numbers. The variation of temperature is shown only in lower insets to enhance readability. This multicycle experiment proved the suitability of cPEVA as programmable thermally controlled actuator as it did not show any change in performance after 250 cycles.

A certain weight content of amorphous domains appears to be essential for gaining a bidirectional actuation, which was created in the PE-based polymers by incorporation of a comonomer like vinyl acetate. The cross-linked homopolymer low-density polyethylene did not show a temperature-memory actuator capability (Table 1). For all investigated cPEVAs comprising a vinyl acetate content in the range of 10 to 35 wt %, a pronounced temperature-memory actuation capability for $T_{sep}$ between 40 and 90° C. was observed whereby the temperature interval for variation of $T_{sep}$ was found to decrease with increasing comonomer content. The cross-links in PEVA also appear to be necessary for a temperature-memory actuator (TMPA). The linear copolymer PEVA did not show a bidirectional actuation. The applied macroscopic deformation during programming did not result in the required orientation of actuation domains because of the missing netpoints interlinking the actuation and the skeleton-forming domains.

TABLE 1

Influence of the vinyl acetate comonomer and cross-linker content on the actuation capability of cPEVA

| Sample ID[a] | $\varepsilon_{ssp}$ (%) | $T_{sep}$ (° C.) | $T_{low}$ (° C.) | $Q_{ef}$ (%) | $\varepsilon'_{rev}$ (%) |
|---|---|---|---|---|---|
| cPEd20 | 250 | 95 | 25 | — | — |
| cPEVA10d20 | 250 | 80 | 25 | 76 ± 1 | 6 ± 1 |
|  | 250 | 85 | 25 | 59 ± 1 | 8 ± 1 |
|  | 250 | 90 | 25 | 35 ± 1 | 6 ± 1 |
|  | 250 | 95 | 25 | 13 ± 1 | −5 ± 1 |
| cPEVA20d20 | 150 | 60 | 25 | 88 ± 1 | 4 ± 1 |
|  | 150 | 65 | 25 | 80 ± 1 | 5 ± 1 |
|  | 150 | 70 | 25 | 67 ± 1 | 6 ± 1 |
|  | 150 | 75 | 25 | 48 ± 1 | 7 ± 1 |
|  | 150 | 80 | 25 | 23 ± 1 | 6 ± 1 |
| cPEVA20d10 | 300 | 75 | 25 | 23 ± 1 | 5 ± 1 |
| cPEVA20d05 | 300 | 75 | 25 | 72 ± 1 | 4 ± 1 |
|  | 300 | 80 | 25 | 50 ± 1 | 4 ± 1 |
| cPEVA31d20 | 50 | 60 | 0 | 58 ± 1 | 6 ± 1 |
|  | 50 | 65 | 0 | 28 ± 1 | 6 ± 1 |
|  | 50 | 70 | 0 | 9 ± 1 | 1 ± 1 |
| cPEVA35d20 | 50 | 50 | 0 | 64 ± 1 | 5 ± 1 |
|  | 50 | 55 | 0 | 41 ± 1 | 5 ± 1 |
|  | 50 | 60 | 0 | 21 ± 1 | 2 ± 1 |

[a]cPEd20: cross-linked low density polyethylene, cPEVAXXdYY cross-linked poly[ethylene-co-(vinyl acetate)] in which XX represents the vinyl acetate fraction in wt % and YY indicates the fraction of dicumyl peroxide used for cross-linking wt % × 10, e.g. d20 represents 2.0 wt % od dicumyl acetate.

In situ wide-angle x-ray scattering (WAXS) and small-angle x-ray scattering (SAXS) measurements were performed to explore structural changes on the nanoscale for cPEVA20d20 during thermally controlled actuation (FIG. 6a,b). At $T_{sep}$ the achieved anisotropic scattering pattern can be attributed solely to the crystalline, skeleton PE domains, orientations become apparent in the anisotropic WAXS diffraction patterns (FIG. 6a). The achieved SAXS data revealed that the lamellae were oriented orthogonally to the direction of the macroscopic deformation (FIG. 6b). Here at $T_{sep}$ a long-period $L(T_{sep})$=15.4 nm was determined for a cPEVA programmed with $\varepsilon_{ssp}$=150%; whereas at $T_{low}$ a long-period $L(T_{low})$=11.4 nm was obtained. After reprogramming with $\varepsilon_{ssp}$=100%, the sample exhibited a $L(T_{sep})$=16.1 nm and $L(T_{low})$=13.1 nm. According to the present model, the macroscopic change during actuation should be reflected on the nanoscale by changes of the long-period. Based on the experimentally determined data at $T_{sep}$ ($\varepsilon_{ssp}$=150%) and the macroscopic changes in length and crystallinity during cooling to $T_{low}$ an estimated long-period at $T_{low}$ could be calculated to $L(T_{low})$=10.7 nm, which corresponds well with the experimental results.

FIG. 7 shows two demonstration examples of a programmable actuator made of cPEVA, where a schematic illustration of the actuator is depicted on the left and depictions of the real actuator on the right. FIG. 7a shows a programmable window shades of cPEVA having three lamellae, which after programming close upon heating and open when cooled. FIG. 7b shows a heat engine driven by a concertina shaped cPEVA drive element, which moves an attached toothed rack forth when heated to $T_{sep}$ and back when cooled to $T_{low}$ whereby its contact pressure to the tooth wheel is controlled by a second cPEVA concertina. Upon cooling to $T_{low}$ this concertina contracts resulting in a lower pressure on the rack enabling the driving element to contract as well. The number of folds in the driving element determines the distance of the forward motion. In this way, the rotation speed of the tooth wheel can be adjusted by the programming of the driving element. The numbers indicate the cycle number of actuation cycles. Parameters of all experiments shown in FIG. 7 were: $T_{prog}$=90° C., $T_{sep}$=75° C., $T_{low}$=25° C. Another potential application are thermally controlled facades providing a self-sufficiently controlled sun protection with adjustable application temperature range.

2. Covalently Cross-Linked Block-Copolymer cPCLBA

The generality of the present concept for designing a temperature-memory polymer actuator was also demonstrated in a covalently cross-linked block-copolymer cPCLBA, where ε-caprolactone (PCL) segments were interconnected by poly(n-butylacrylate) segments (FIG. 9). The PCL domains provide a $\Delta T_m$ between 5 and 60° C., which can be utilized for the skeleton-forming function (SD) and actuation function (AD), while the amorphous poly(n-butylacrylate) containing domains ensure the material's elasticity. In cyclic thermo-mechanical tests a pronounced temperature-memory actuation capability could be achieved for cPCLBA. After programming with $\varepsilon_{ssp}$=150% at $T_{prog}$=60° C., cooling to $T_{low}$=10° C. and heating to $T_{sep}$=45° C., the material could be reversible switched from shape A with $\varepsilon_A$=22% and shape B with $\varepsilon_B$=42% (FIG. 9a). By variation of $T_{sep}$ between 40 and 50° C. the actuation temperatures could be adjusted in the range between 22±1 and 43±1° C. (FIG. 9d) and an $\varepsilon'_{rev}$ up to 19% was determined (FIG. 9c).

In a further experiment using cPCLBA, a ribbon of this material was deformed at $T_{prog}$=60° C. to a concertina-like shape, cooled to $T_{low}$=0° C. in ice water and heated at stress-free conditions to $T_{sep}$=43° C. In the subsequent reversibility cycle, the reversible shape changed between a flat shape at $T_{sep}$=43° C. and a concertina-like shape at $T_{low}$=0° C. as shown in FIG. 9b (images for $T_{low}$ were recorded at room temperature).

3. Covalently Cross-Linked Block-Copolymer (cPCLPCHMA)

An rTME could also be shown for the block copolymer network cPCLPCHMA comprising segments of poly(caprolactone) and poly(cyclohexyl methacrylate), see FIG. 10. In this system, the crystallizable PCL segments served as skeleton as well as actuation domains.

4. Covalenty cross-linked blends of HDPE and poly[ethylene-co-octene]

The cross-linked blends cHPEbEOC of high-density polyethylene HDPE and the random copolymer poly[ethylene-co-octene]also exhibited an rTME. FIGS. 11a and b show the elongation versus time plots for the network cross-linked with 1 wt % and 2 wt % of dimucyl peroxide, respectively. As expected, the degree of actuation was higher in the network having the higher cross-linking densitiy.

TABLE 2

Influence of cross-linker content on the actuation capability of cross-linked blends HDPE

| Sample ID[a] | $\varepsilon_{ssp}$ (%) | $T_{sep}$ (° C.) | $T_{low}$ (° C.) | $Q_{ef}$ (%) | $\varepsilon'_{rev}$ (%) |
|---|---|---|---|---|---|
| cHPEbEOC15d20 | 500 | 100 | 25 | 58 ± 1 | 15 ± 1 |
| | 500 | 110 | 25 | 36 ± 1 | 19 ± 1 |
| | 500 | 120 | 25 | 12 ± 1 | −5 ± 1 |
| cHPEbEOC15d10 | 500 | 100 | 25 | 82 ± 1 | 5 ± 1 |
| | 500 | 110 | 25 | 69 ± 1 | 6 ± 1 |
| | 500 | 120 | 25 | 39 ± 1 | 0 ± 1 |

[a]cHPEbEOC15dXX: cross-linked blend of high density polyethylene with 15 wt % of poly(ethylene-co-octene) dXX indicates weight amount of dimucyl peroxide used for cross-linking in X.X wt %

5. cPEMAGMA and its Blend with PCL

Covalently cross-linked poly[ethylene-co-(methyl acrylate)-co-(glycidyl methacrylate)] cPEMAGMA was studied alone as well as cross-linked blend with poly(ε-caprolactone) PCL. After programming with $\varepsilon_{ssp}$=200%, $T_{prog}$=85° C. and $T_{low,fix}$=−10° C., the single polymer network cPEMAGMA could reversibly be switched between $\varepsilon_A$=82% at $T_{sep}$=60° C. and $\varepsilon_B$=91% at $T_{low}$=10° C. (FIG. 12a,b).

The cross-linked blend of PEMAGMA with PCL after programming with $\varepsilon_{ssp}$=400%, $T_{prog}$=90° C. and $T_{low,fix}$=−10° C. also showed reversible bidirectional shape-shift upon temperature change between $T_{low}$=25° C. and $T_{sep}$=70° C. (FIG. 12c,d) or $T_{sep}$=60° C. (FIG. 12e,f), respectively.

The results of these measurements are shown in Table 3.

6. cPEAEMA and its Blend with PCL

Covalently cross-linked poly[ethylene-co-(acrylic ester)-co-(maleic anhydride)] cPEAEMA was studied alone as well as cross-linked blend with poly(ε-caprolactone) PCL. After programming with $\varepsilon_{ssp}$=400%, $T_{prog}$=90° C. and $T_{low,fix}$=−10° C., the single polymer network cPEAEMA could reversibly be switched between $\varepsilon_A$=256% at $T_{sep}$=70° C. and $\varepsilon_B$=302% at $T_{low}$=25° C. (FIG. 13a,b).

The cross-linked blend of PEAEMA with PCL after programming with $\varepsilon_{ssp}$=400%, $T_{prog}$=90° C. and $T_{low,fix}$=−10° C. also showed reversible bidirectional shape-shift upon temperature change between $T_{low}$=25° C. and $T_{sep}$=70° C. (FIG. 13c,d) or $T_{sep}$=60° C. (FIG. 13e,f), respectively.

The results of these measurements are shown in Table 3.

7. cPEVA and its Blend with PCL

Covalently cross-linked poly[ethylene-co-(vinyl acetate)] cPEVA was studied alone as well as cross-linked blend with poly(ε-caprolactone) PCL. After programming with $\varepsilon_{ssp}$=150%, $T_{prog}$=90° C. and $T_{low,fix}$=0° C., the single polymer network cPEVA could reversibly be switched between $\varepsilon_A$=124% at $T_{sep}$=70° C. and $\varepsilon_B$=136% at $T_{low}$=25° C. (FIG. 14a,b).

The cross-linked blend of PEVA with PCL after programming with $\varepsilon_{ssp}$=250%, $T_{prog}$=90° C. and $T_{low,fix}$=−10° C. also showed reversible bidirectional shape-shift upon temperature change between $T_{low}$=25° C. and $T_{sep}$=70° C. (FIG. 14c,d) or $T_{sep}$=60° C. (FIG. 14 e,f), respectively. The results of these measurements are shown in Table 3.

TABLE 3

Actuation magnitude and recovery magnitude for cPEMAGMA, cPEAEMA and cPEVA and their blends with PCL from cyclic thermo-mechanical measurements.

| Polymer | $\varepsilon_{ssp}$ (%) | $T_{prog}$ (° C.) | $T_{low,fix}$ (° C.) | $T_{sep}$ (° C.) | $T_{low}$ (° C.) | $\varepsilon_A$ (%) | $\varepsilon_B$ (%) |
|---|---|---|---|---|---|---|---|
| cPEMAGMA | 200 | 85 | −10 | 60 | 10 | 82 | 91 |
| c(PEMAGMA/PCL) | 400 | 90 | −10 | 70 | 25 | 35 | 39 |
| c(PEMAGMA/PCL) | 400 | 90 | −10 | 60 | 25 | 93 | 107 |
| cPEAEMA | 400 | 90 | −10 | 70 | 25 | 256 | 302 |
| c(PEAEMA/PCL) | 400 | 90 | −10 | 70 | 25 | 135 | 151 |
| c(PEAEMA/PCL) | 400 | 90 | −10 | 60 | 25 | 204 | 231 |
| cPEVA | 150 | 90 | 0 | 70 | 25 | 124 | 136 |
| c(PEVA/PCL) | 250 | 90 | −10 | 70 | 25 | 104 | 119 |
| c(PEVA/PCL) | 250 | 90 | −10 | 60 | 25 | 142 | 168 |

| Polymer | $\varepsilon_{sep}$ (%) | $T_{act}$ (A→B) (° C.) | $T_{act}$ (B→A) (° C.) | $R_{act}$ (%) | $R_{rev}$ (%) |
|---|---|---|---|---|---|
| cPEMAGMA | 80 | 35 ± 1 | 52 ± 1 | 10 ± 1 | 124 ± 3 |
| c(PEMAGMA/PCL) | 32 | 39 ± 1 | 59 ± 1 | 12 ± 1.5 | 172 ± 5 |
| c(PEMAGMA/PCL) | 89 | 41 ± 1 | 58 ± 1 | 15 ± 1.2 | 125 ± 4 |
| cPEAEMA | 255 | 45 ± 1 | 63 ± 1 | 17 ± 1.8 | 102 ± 3 |
| c(PEAEMA/PCL) | 131 | 42 ± 1 | 58 ± 1 | 12 ± 0.5 | 128 ± 4 |
| c(PEAEMA/PCL) | 201 | 44 ± 1 | 58 ± 1 | 13 ± 1 | 110 ± 3 |
| cPEVA | 124 | 51 ± 1 | 66 ± 1 | 10 ± 0.3 | 100 ± 1 |
| c(PEVA/PCL) | 102 | 43 ± 1 | 59 ± 1 | 14 ± 0.5 | 112 ± 5 |
| c(PEVA/PCL) | 145 | 45 ± 1 | 59 ± 1 | 18 ± 0.5 | 85 ± 3 |

$\varepsilon_{ssp}$: elongation in programming cycle,
$T_{prog}$: programming temperature,
$T_{low,fix}$: fixation temperature in programming cycle;
$T_{sep}$: separation temperature in bidirectional cycles,
$T_{low}$: lower temperature in bidirectional cycles;
$\varepsilon_A$: elongation at $T_{sep}$;
$\varepsilon_B$: elongation at $T_{low}$;
$T_{act}$(A→B): actuation temperature during cooling,
$T_{act}$(B→A): actuation temperature during heating,
$R_{act}$: actuation magnitude during cooling,
$R_{rev}$: actuation magnitude during heating

8. Integrated in-Line Extrusion Process for the Preparation of Bidirectional TME Actuators A new manufacture process and was developed allowing in one integral in-line extrusion process to prepare covalently cross-linked polymer actuators equipped with a reversible bidirectional temperature-memory effect. The process allows programming at different temperatures, including cold drawing, and different strain ratios. The material of interest can be processed in the form of films or fibers or tubes with various dimensions. The apparatus set-up of the in-line processing according to a preferred embodiment is described in FIG. 15. Components utilized within the in-line process first comprise a twin screw extruder having a heating zone (1), where the material is melted. In one or two subsequent curing zones (2) and (4) the material is cured by UV radiation, temperature, electron beam and/or gamma irradiation. A set of haul-offs (3), (5), (7) adjust the desired material extension ratio (λ) during programming relative to extrusion speed in order to provide a desired elongation ($\varepsilon_{ssp}$). A first cooling/heating zone (6) brings the material to the programming temperature $T_{prog}$, whereas a second cooling zone (8) cools the material to ambient temperature. A further haul-off (9) comprising a spooler (winding machine) is used to collect the material of interest in the form of films, fibers and catheter tubes. The TME actuator is thus manufactured as an endless structure of a film, fiber or tube. Optionally, instead of the haul-off (9) a cutting means may be provided for tailoring the endless material into desired pre-cut parts.

9. Preparation of cPEVA-Monofilament Fibers

A mixture of poly(ethylene-co-vinyl acetate) (PEVA), triallyl isocyanurate (TIAC) as cross-linking agent and benzophenone (BP) as photoinitiator was fed to an extruder as shown in FIG. 15 and formed to a filament. The filament was UV irradiated (50% UV intensity (relative to max. UV intensity output) in the first curing zone (2) and 85% UV intensity in the second curing zone (4)) to yield covalently cross-linked fibers cPEVA. The UV irradiation was integrated in the extrusion process as well as the rTME functionalization of the cPEVA monofilaments by elongation to the extension ratio ($\lambda$=l/L, with l=final length and L=original length) at different temperatures $T_{prog}$. For the rTME functionalization two different programming temperatures were applied:

1) $T_{prog} \geq T_{trans,offset} = 110°$ C.
2) $T_{prog} \leq T_{trans,onset} = 25°$ C. (cold drawing), $\lambda$ was varied in the range from $\lambda$=1.2 to $\lambda$=2.8. Details of the characteristics for a particular example of cPEVA monofilament fibers (1 part per weight TIAC, 1 part per weight BP based n 100 parts polymer), were as follows:

Cross-link density: 245 mol·m$^{-3}$
Mc: 4.07 Kg/mol
Diameter as produced: 0.662 mm
Shrunken diameter: 0.782 mm
Gel content: 89%
E-Modulus: 19.00±0.06 MPa
Tensile strength: 25.34±1.34 MPa
Shrinkage at 100° C.: 38%
Elongation at break: 800±53%

In a demonstration experiment, the differently programmed ($T_{prog}$=25° C. or $T_{prog}$=110° C.) filaments of cPEVA were horizontally fixed with both ends in a chamber equipped with a temperature control. Then the temperature in chamber was controlled to vary between $T_{low}$=25° C. and various $T_{sep}$=40, 50, 60, 70 or 80° C. in repetitive heating-cooling cycles. Whereby, the cPEVA fiber reversibly deflects at 25° C. and contracts at $T_{sep}$. The rTME performance was characterized by the difference in strain between shape B at $T_{sep}$ and shape A at $T_{low}$ $\Delta\epsilon=\epsilon_{low}-\epsilon_{high}$ or the reversible strain $\epsilon_{rev}=(\epsilon_{low}-\epsilon_{high})/\epsilon_{high}$, as well as the actuation temperatures obtained during heating $T_{act}$(A→B) and cooling $T_{act}$(B→A).

In FIG. 16a the strain-time-diagram of the reversible shape-shifting cycle of the cold drawn cPEVA filament ($T_{prog}$=25° C.) is shown, whereby $T_{low}$=25° C. was kept constant and $T_{sep}$ was subsequently increased from 40 to 50 to 60 to 70 to 80° C. Here $\Delta\epsilon$ was found to increase from 1.5% to 6% with increasing $T_{sep}$ in the repetitive heating-cooling cycles. At $T_{sep}$ the actuation temperatures obtained during heating $T_{act}$(A→B)=52° C. and cooling $T_{act}$(B→A)=62° C. were obtained from the inflection points in the respective strain-temperature-diagram (FIG. 16b).

The dependence of the reversible strain ($\epsilon_{rev}$) on the extension ratio ($\lambda$) achieved for cPEVA monofilaments functionalized at $T_{prog}$=25° C. (FIG. 17a) and $T_{prog}$=110° C. (FIG. 17b) revealed a slight increase with increasing $\lambda$, when $T_{sep}$ was fixed and a substantial increase from values for $\epsilon_{rev}$ around 35 to 15% when $T_{sep}$ was increased from 40 to 80° C.

10. Comparison of cPEVA Programmed at $T_{prog} \geq T_{trans,offset}$ and by Cold Drawing at $T_{prog} \leq T_{trans,onset}$ Films were prepared from covalently cross-linked poly (ethylene-co-vinyl acetate) by thermally cross-linking using 2 wt % dimucyl peroxide as cross-linking agent (cPEVA20d20). The films were programmed using a programming temperature above the transition region at $T_{prog} \geq T_{trans,offset}$, namely at 110° C., to an elongation of 150% or by cold drawing at $T_{prog} \leq T_{trans,onset}$, namely at 25° C., to an elongation of 400% (or 1000%) and thus equipped with an rTME. The deformation was in both cases a uniaxial elongation. With both programming methods a comparable reversible elongation of $\epsilon_{rev}$=15% was achieved in subsequent actuation cycles. When the elongation was 1000% in the cold drawing process a higher reversible strain around 30% could be achieved (see FIG. 19).

Using in situ small-angle X-ray scattering (SAXS) during reversibly heating to $T_{sep}$ and cooling to $T_{low}$ it was found that the cPEVA systems programmed by cold drawing have a different crystal structure compared to that of the samples programmed at the high temperature of 110° C. as reflected in characteristic differences in the scattering patterns (FIG. 18, top) as well as in the corresponding intensity plots (FIG. 18, bottom). Two strong reflexes are located in the direction of deformation along the fiber axis ($s_3$). Reflexes of the sample deformed at 110° C. sample are sharper and more defined than the reflexes of the cold drawn sample that are laterally broadened and have a sickle-like appearance. Cold drawing to an elongation of 400% thus results in structures that are laterally less expanded and are less orientated during the bSME cycle than those obtained by programming at 110° C.

Integration over the reflexes in the direction of deformation yield intensity versus $s_3$ profiles indicative of a Longperiod, i.e. the distance between crystalline domains, that is higher at $T_{sep}$=75° C. than at $T_{low}$=25° C. since the peak maxima are located at smaller values in the reciprocal space. This is due to molten areas at 75° C. (crystalline at 25° C.) leading to voids between the crystallites and to an increase of the Longperiod. Notably, this difference remains visible despite the contraction of the sample counteracting this effect as contraction reduces the distances. At $T_{sep}$=75° C. the peak intensity of the cold drawn sample is smaller than that programmed at 110° C. indicating that less crystallites are present. The deformation at 25° C. thus reduces the average crystal size and the crystals melt at lower temperatures so that at 75° C. less crystals are present.

11. Comparison of cPEVA Programmed at $T_{trans,onset} \leq T_{prog} \leq T_{trans,offset}$ and by Cold Drawing at $T_{prog} \leq T_{trans,onset}$ Films were prepared from covalently cross-linked poly (ethylene-co-vinyl acetate) by thermally cross-linking using 2 wt % dimucyl peroxide as cross-linking agent (cPEVA20d20). The films were programmed using a programming temperature within the transition region at $T_{trans,offset} \leq T_{prog} \leq T_{trans,offset}$, namely at 45, 60, 65, 75 and 90° C., to an elongation of 150%, or by cold drawing at $T_{prog} \leq T_{trans,onset}$, namely at 25° C., to an elongation of 150% and thus equipped with an rTME. The deformation was in both cases a uniaxial elongation. The rTME was investigated with $T_{low}$=25° C. and $T_{sep}$ 75° C.

While for the cold drawn sample with $T_{prog}$=25° C. and $\epsilon_{ssp}=\epsilon_{prog}$=150% a normal thermal expansion behavior (increase in strain upon heating and a decrease in strain upon cooling) instead of a rTME was observed, samples programmed at higher programming temperatures of 45, 60, 65, 75 and 90° C. exhibited a pronounced rTME, whereby the reversible strain was found to increase with increasing $T_{prog}$ (FIG. 20). This results clearly demonstrate that a minimum degree of orientation of the PE crystallites, represented by the applied elongation ($\epsilon_{prog}$) during cold drawing programming ($T_{prog}$=25° C.) has to be present to enable a rTME. In this particular case $\epsilon_{prog}$=150% was not sufficient, whereas a pronounced rTME could be observed for cold drawn cPEVA20d20 with $\epsilon_{prog}$=400% or 1000% (see also previous section). In Table 4 the reversible strains achieved at different programming temperatures are listed.

TABLE 4

Influence of programming temperature on the actuation capability of cross-linked cPEVA (cPEVA20d20)

| $\epsilon_{ssp}$ (%) | $T_{sep}$ (° C.) | $T_{low}$ (° C.) | $T_{prog}$ (° C.) | $\epsilon'_{rev}$ (%) |
|---|---|---|---|---|
| 150 | 75 | 25 | 25 | −0.6 |
| 150 | 75 | 25 | 45 | 1.1 |
| 150 | 75 | 25 | 60 | 3.4 |
| 150 | 75 | 25 | 65 | 5.5 |
| 150 | 75 | 25 | 75 | 10.9 |
| 150 | 75 | 25 | 90 | 7.9 |

12. Reversible Actuation Capability of cPCL cPCL was prepared by cross-linking a linear (thermoplastic) PCL with 2 wt % of DCP. The PCL polymer network exhibited a gel content G of 70±2% and the degree of swelling Q was 5650±15%. DSC experiments revealed a melting temperature interval of $\Delta T_m$=30° C. from $T_{m,onset}$=35° C. to the $T_{m,offset}$=65° C. cPCL showed a melting temperature ($T_m$) peak at 57±1° C. and a crystallization temperature peak ($T_c$) at 18±1° C. (FIG. 21a). cPCL exhibited a Young's modulus of E=1.15±0.1 MPa and an elongation at break of $\epsilon_b$ 790±30% as determined in tensile tests at ambient temperature (FIG. 21c). Additionally, the stress-strain curves obtained at 95° C. were analyzed by the Mooney-Rivlin approach and corresponding plot between reduced stress and reciprocal stretch ratio is presented (FIG. 21d). The calculated C2 values were found to be significantly higher than the C1 values, which indicate that the mechanical properties of the cross-linked network are dominated by the physical cross-links. The cPCL with 2 wt % DCP showed cross-linking density around $v_c \approx 3.5 \cdot 10^{-4}$ mol·cm$^{-3}$ and the molecular weight was around $M_c \approx 1.09 \cdot 10^4$ g·mol$^{-1}$.

rTME quantification was performed in a two-step procedure comprising programming at $T_{prog}$=90° C. with $\epsilon_{prog}$=400% (or 600%), while different $T_{sep}$ within $\Delta T_m$ of cPCL ($T_{sep}$=60° C., 55° C. and 50° C.) were applied in the reversibility cycles and $T_{low}$ was 10° C. (FIG. 22a). In FIG. 22b, strain is plotted against temperature for the second reversibility cycle for determination of the characteristic switching temperatures $T_{sw,act}$ (A→B) during actuation (cooling) and $T_{sw,rec}$ (B→A) during recovery (heating) from the inflection points of the ε-T plot. The cPCL exhibited characteristic switching temperatures of $T_{sw,act}$ (A→B)=49±1° C. and $T_{sw,rec}$ (B→A)=58±1° C. The highest value of $\epsilon'_{rev}$ was obtained for $T_{sep}$=60° C. with $\epsilon'_{rev}$=16±2%, while significantly lower values of $\epsilon'_{rev}$=4% ($T_{sep}$=55° C.) and $\epsilon'_{rev}$=1% ($T_{sep}$=50° C.) were found at lower $T_{sep}$ (FIG. 22c). Furthermore, an increase in $\epsilon'_{rev}$ could be obtained when $\epsilon_{prog}$=400% was increased to 600% (FIG. 22d).

For quantification of the free-standing rTME bending experiments were conducted. Here the initially straight cPCL test specimen was bent to 180° (a hairpin like shape) in the complete amorphous state using water bath with $T_{prog}$=90° C. For fixation of the deformed sample, the test specimen was transferred into a water bath having a temperature of 5° C. while keeping the deformation strain. The cyclic, reversible shape changes were realized by repetitively exposing the programmed sample into a water bath with $T_{high}$=50° C. (Shape A) and a water bath with $T_{low}$=5° C. (Shape B). The reversible shape changes were recorded with a camera by single photographs for each cycle. A change in bending angle between $\theta(T_{low})$=65° (Shape B) and $\theta(T_{high})$=100° (Shape A) could be observed, which is equivalent with a reversible change of 35° in angle (θ') (see FIG. 23). The repeatability of this angle change was realized by 6-8 consecutive heating-cooling cycles in water, and the specimen changed its shape reversibly without losing the memory of both the shapes. Moreover the reversible change in angle was normalized by dividing it by the initial bending angle to obtain a relative change of 19%.

13. Reversible Actuation Capability of Microstructured cPEVA Surfaces

Microstructured cPEVA films were prepared via a PDMS mold comprising an array of cylindrical holes with 10 μm hight (H) and 10 μm diameter (D), whereby the thermal cross-linking of PEVA with 2 wt % of dicumyl peroxide (DCP) was conducted using the PDMS template (see also method section). The microstructured cPEVA sample was programmed by vertical compression at 70° C. and fixed at 0° C. A schematic representation of the preparation and programming of microstructured cPEVA surfaces is shown in FIGS. 24a and b, respectively.

For rTME investigation various separation temperatures $T_{sep}$=50° C., 60° C., 70° C., and 80° C., were applied, while the $T_{low}$ was kept at 20° C. For each separating temperature $T_{sep}$ three reversibility cycles were performed before increasing to the next higher separating temperature (see FIG. 25a,b). The changes in height of the single cylindrical pillars at different temperatures were explored by AFM experiments with AC mode.

In these experiments it was found that the recovered height (FIG. 25b) as well as the reversible height change of the single cylindrical pillars (FIG. 25 c) increased from 0.2 μm to 0.8 μm with increasing $T_{sep}$ from 50° C. to 80° C. The microstructured cPEVA film exhibited similar reversible strains of $\epsilon_{rev}$ up to 15% at 50° C. as their elongated macroscopic counterparts.

The invention claimed is:

1. A method of preparing an actuator capable of being repeatedly and reversibly shifted between two freestanding shapes (A, B) under stress-free conditions upon varying a temperature between a temperature $T_{low}$ and a temperature $T_{sep}$, the method comprising the steps:
   (a) providing an actuator comprising a covalently or physically cross-linked polymer network comprising chain segments, the polymer comprising a first phase having a thermodynamic phase transition extending in a temperature range from $T_{trans,onset}$ to $T_{trans,offset}$, and an elastic phase having a glass transition temperature $T_g$, with $T_g$<$T_{trans,onset}$, the polymer having an initial shape;
   (b) deforming the polymer to a deformation shape at a temperature $T_{prog}$ by applying a stress, where the deformation is adapted to align chain segments of the polymer;
   (c) setting the polymer to a temperature $T_{low}$ with $T_{low}$≤$T_{trans,onset}$ under maintaining the stress as to provide a solidified state of the polymer domains associated with the first phase, and then releasing the stress and changing the shape to shape B;
   (d) heating the polymer to the predetermined separation temperature $T_{sep}$, with $T_{trans,onset}$<$T_{sep}$<$T_{trans,offset}$, under stress-free conditions as to melt first polymeric domains (AD) of the first phase having a transition temperature in the range between $T_{trans,onset}$ and $T_{sep}$ and to maintain second domains (SD) of the first phase having a transition temperature in the range between $T_{sep}$ and $T_{trans,offset}$ in the solidified state, thus implementing shape A, where shape A geometrically lies between the initial shape provided in step (a) and the deformation shape applied in step (b) and shape B is the shape at $T_{low}$ and lies geometrically between shape A and the shape of deformation of step (b).

2. The method of claim 1, wherein the temperature $T_{sep}$ is predetermined such as to implement a desired actuation temperature $T_{act}(A \rightarrow B)$ or $T_{act}(B \rightarrow A)$, which is the temperature at which the maximum rate of the shape-shift from shape A to shape B or from shape B to shape A, respectively, occurs.

3. The method of claim 2, wherein the predetermination of the separation temperature $T_{sep}$ is effected using an empirically determined mathematical relationship between the separation temperature $T_{sep}$ and the actuation temperature $T_{act}(A \rightarrow B)$ or $T_{act}(B \rightarrow A)$ or using an empirically determined characteristic map correlating the separation temperature $T_{sep}$ and the actuation temperature $T_{act}(A \rightarrow B)$ or $T_{act}(B \rightarrow A)$.

4. The method of claim 1, wherein the separation temperature $T_{sep}$ is predetermined such as to set a desired degree of actuation during the shape-shift from shape A to shape B or from shape B to shape A, respectively.

5. The method of claim 1, comprising repeating steps (c) and (d) using a varying separation temperature $T_{sep}$, resulting in different actuation temperatures $T_{act}(A \rightarrow B)$ or $T_{act}(B \rightarrow A)$.

6. The method of claim 1, wherein the difference between $T_{trans,onset}$ and $T_{trans,offset}$ is at least 20 K.

7. The method of claim 1, wherein the difference between $T_{sep}$ and $T_{trans,onset}$ and/or between $T_{sep}$ and $T_{trans,offset}$ is at least 5 K.

8. The method of claim 1, wherein the deformation comprises elongation, compression or bending or torsion of the polymer or any combination thereof.

9. The method of claim 1, wherein the thermodynamic phase transition of first phase corresponds to a crystallization transition or a glass transition of the first phase.

10. The method of claim 1, wherein, in step (b), the deformation of the polymer occurs at a temperature $T_{prog}$, with $T_{prog} > T_{trans,offset}$, so that the polymer is in a rubbery-elastic state and step (c) comprises cooling the polymer to the temperature $T_{low}$.

11. The method of claim 1, wherein, in step (b), the deformation of the polymer occurs at a temperature $T_{prog}$, with $T_{trans,onset} < T_{prog} \leq T_{trans,offset}$, so that the polymer is in a semi-solidified state, and step (c) comprises cooling the polymer to the temperature $T_{low}$.

12. The method of claim 1, wherein, in step (b), the deformation of the polymer occurs at a temperature $T_{prog}$, with $T_{prog} \leq T_{trans,onset}$, so that the polymer is in a solidified state, and step (c) comprises heating the polymer to or maintaining the polymer at the temperature $T_{low}$.

* * * * *